(12) United States Patent
Sonoda et al.

(10) Patent No.: US 8,657,205 B2
(45) Date of Patent: Feb. 25, 2014

(54) IMAGE PROCESSING APPARATUS, IDENTIFICATION APPARATUS, METHOD FOR DETERMINING BIT SEQUENCE AND COMPUTER READABLE MEDIUM

(75) Inventors: Takashi Sonoda, Yokohama (JP); Takeshi Onishi, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 259 days.

(21) Appl. No.: 13/105,578

(22) Filed: May 11, 2011

(65) Prior Publication Data

US 2012/0062960 A1 Mar. 15, 2012

(30) Foreign Application Priority Data

Sep. 15, 2010 (JP) ................................. 2010-207338

(51) Int. Cl.
*G06K 19/06* (2006.01)
(52) U.S. Cl.
USPC ........................................................ 235/494
(58) Field of Classification Search
USPC ........................................ 235/494, 456, 375
See application file for complete search history.

(56) References Cited

U.S. PATENT DOCUMENTS

| | | | |
|---|---|---|---|
| 5,771,245 A * | 6/1998 | Zhang | 714/762 |
| 6,000,613 A * | 12/1999 | Hecht et al. | 235/456 |
| 6,548,768 B1 | 4/2003 | Pettersson et al. | |
| 6,663,008 B1 | 12/2003 | Pettersson et al. | |
| 6,674,427 B1 | 1/2004 | Pettersson et al. | |
| 7,172,131 B2 | 2/2007 | Pettersson et al. | |
| 7,248,250 B2 | 7/2007 | Pettersson et al. | |
| 7,281,668 B2 | 10/2007 | Pettersson et al. | |
| 7,588,191 B2 | 9/2009 | Pettersson et al. | |
| 7,604,180 B2 | 10/2009 | Sonoda et al. | |
| 7,611,067 B2 | 11/2009 | Sonoda | |
| 2004/0042420 A1* | 3/2004 | Agarwal et al. | 370/310.1 |
| 2010/0096458 A1 | 4/2010 | Pettersson et al. | |
| 2011/0198394 A1* | 8/2011 | Hammerl et al. | 235/375 |

FOREIGN PATENT DOCUMENTS

| | | | |
|---|---|---|---|
| JP | 2003-511762 A | 3/2003 | |
| JP | 4207049 B2 | 1/2009 | |
| JP | 4238538 B2 | 3/2009 | |
| JP | 4239850 B2 | 3/2009 | |
| JP | 4289350 B2 | 7/2009 | |

* cited by examiner

*Primary Examiner* — Daniel Hess
(74) *Attorney, Agent, or Firm* — Sughrue Mion, PLLC

(57) ABSTRACT

An image processing apparatus includes: an image acquisition unit that acquires an image read from a medium having the image printed thereon, the image representing a specific bit sequence; an information acquisition unit that acquires a state information piece indicating a reading state of the image acquired by the image acquisition unit; a detection unit that detects a bit sequence from the image acquired by the image acquisition unit; and a determination unit that determines the specific bit sequence on the basis of the bit sequence detected by the detection unit and the state information piece acquired by the information acquisition unit.

11 Claims, 21 Drawing Sheets

DOT RELIABILITY-LEVEL ARRAY

9C2
TWO DOTS ARRANGED
IN NINE DOT AREAS

COVERAGE
5.56%

INFORMATION
AMOUNT
0.036bit/pixel

12 PIXELS

9C3
THREE DOTS ARRANGED
IN NINE DOT AREAS

COVERAGE
8.33%

INFORMATION
AMOUNT
0.044bit/pixel

12 PIXELS

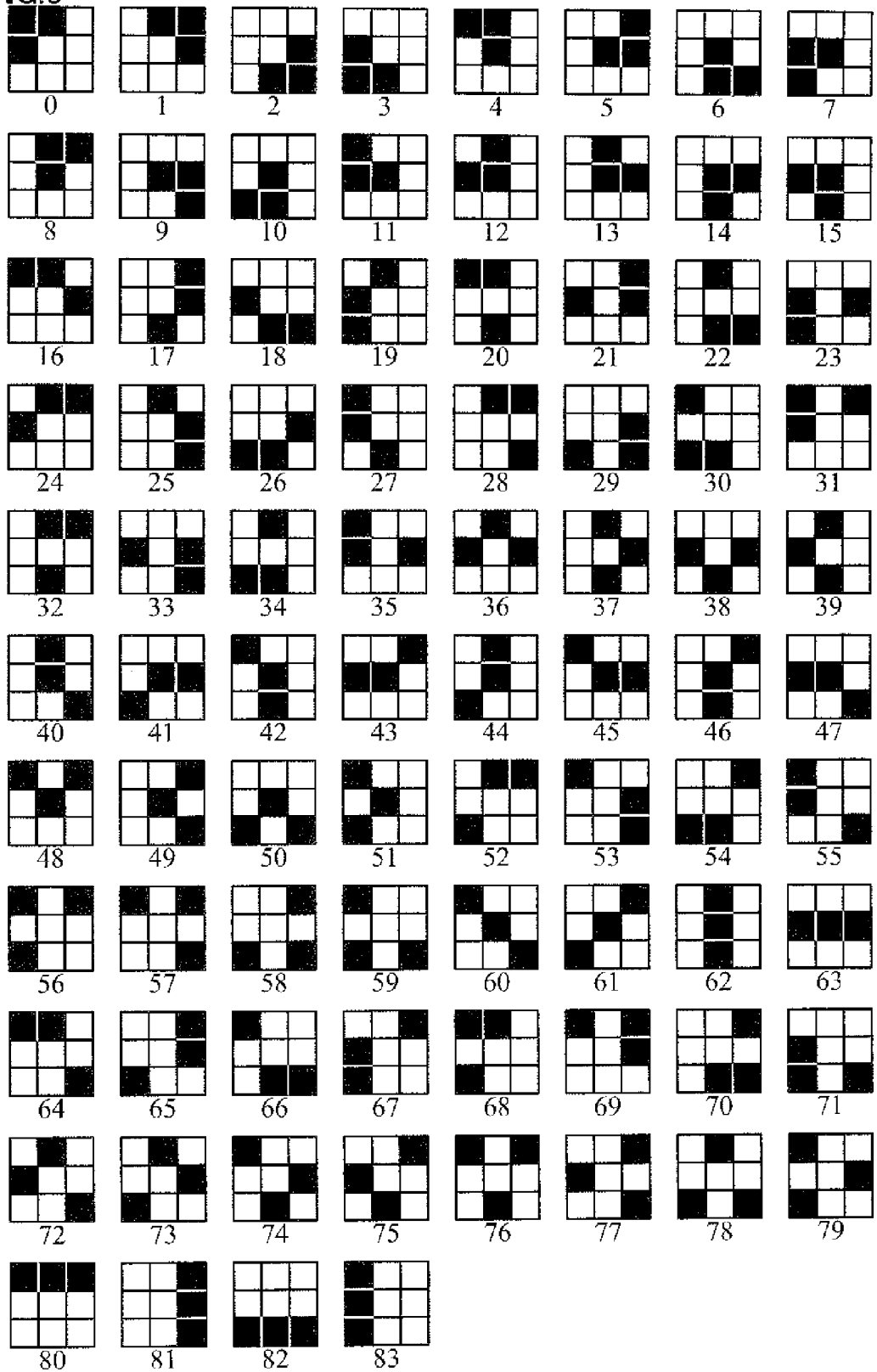

FIG.4A
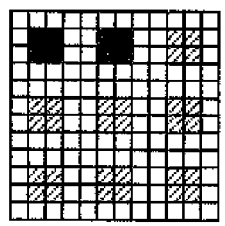
PATTERN 32
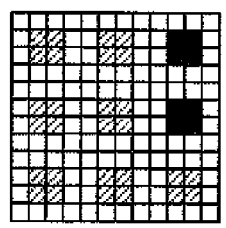
PATTERN 33
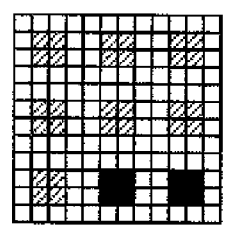
PATTERN 34
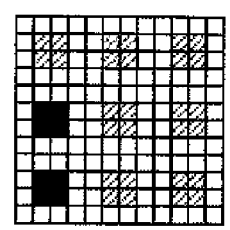
PATTERN 35
FIG.4B
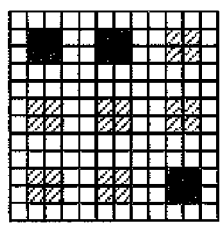
PATTERN 64
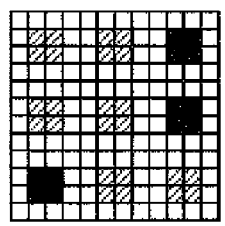
PATTERN 65
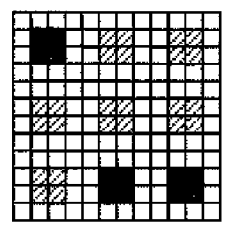
PATTERN 66
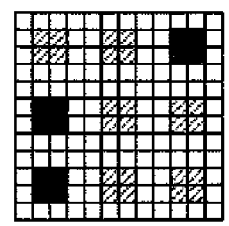
PATTERN 67
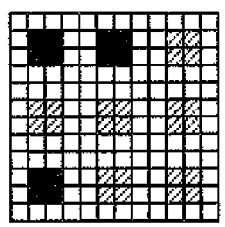
PATTERN 68
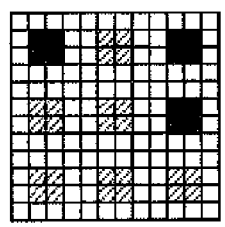
PATTERN 69
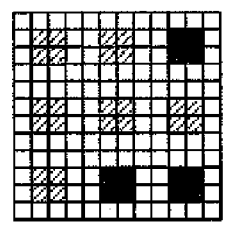
PATTERN 70
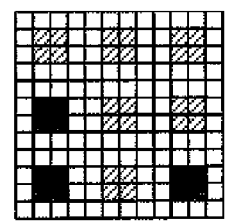
PATTERN 71

9C2
TWO DOTS ARRANGED
IN NINE DOT AREAS

9C3
THREE DOTS ARRANGED
IN NINE DOT AREAS

FIG.7

| S | X01 | X02 | X03 | X04 | S | X05 | X06 | X07 | X08 | S | X09 | X10 | X11 | X12 |
|---|---|---|---|---|---|---|---|---|---|---|---|---|---|---|
| Y01 | I01 | I02 | I03 | I04 | Y01 | I01 | I02 | I03 | I04 | Y01 | I01 | I02 | I03 | I04 |
| Y02 | I05 | I06 | I07 | I08 | Y02 | I05 | I06 | I07 | I08 | Y02 | I05 | I06 | I07 | I08 |
| Y03 | I09 | I10 | I11 | I12 | Y03 | I09 | I10 | I11 | I12 | Y03 | I09 | I10 | I11 | I12 |
| Y04 | I13 | I14 | I15 | I16 | Y04 | I13 | I14 | I15 | I16 | Y04 | I13 | I14 | I15 | I16 |
| S | X01 | X02 | X03 | X04 | S | X05 | X06 | X07 | X08 | S | X09 | X10 | X11 | X12 |
| Y05 | I01 | I02 | I03 | I04 | Y05 | I01 | I02 | I03 | I04 | Y05 | I01 | I02 | I03 | I04 |
| Y06 | I05 | I06 | I07 | I08 | Y06 | I05 | I06 | I07 | I08 | Y06 | I05 | I06 | I07 | I08 |
| Y07 | I09 | I10 | I11 | I12 | Y07 | I09 | I10 | I11 | I12 | Y07 | I09 | I10 | I11 | I12 |
| Y08 | I13 | I14 | I15 | I16 | Y08 | I13 | I14 | I15 | I16 | Y08 | I13 | I14 | I15 | I16 |
| S | X01 | X02 | X03 | X04 | S | X05 | X06 | X07 | X08 | S | X09 | X10 | X11 | X12 |
| Y09 | I01 | I02 | I03 | I04 | Y09 | I01 | I02 | I03 | I04 | Y09 | I01 | I02 | I03 | I04 |
| Y10 | I05 | I06 | I07 | I08 | Y10 | I05 | I06 | I07 | I08 | Y10 | I05 | I06 | I07 | I08 |
| Y11 | I09 | I10 | I11 | I12 | Y11 | I09 | I10 | I11 | I12 | Y11 | I09 | I10 | I11 | I12 |
| Y12 | I13 | I14 | I15 | I16 | Y12 | I13 | I14 | I15 | I16 | Y12 | I13 | I14 | I15 | I16 |

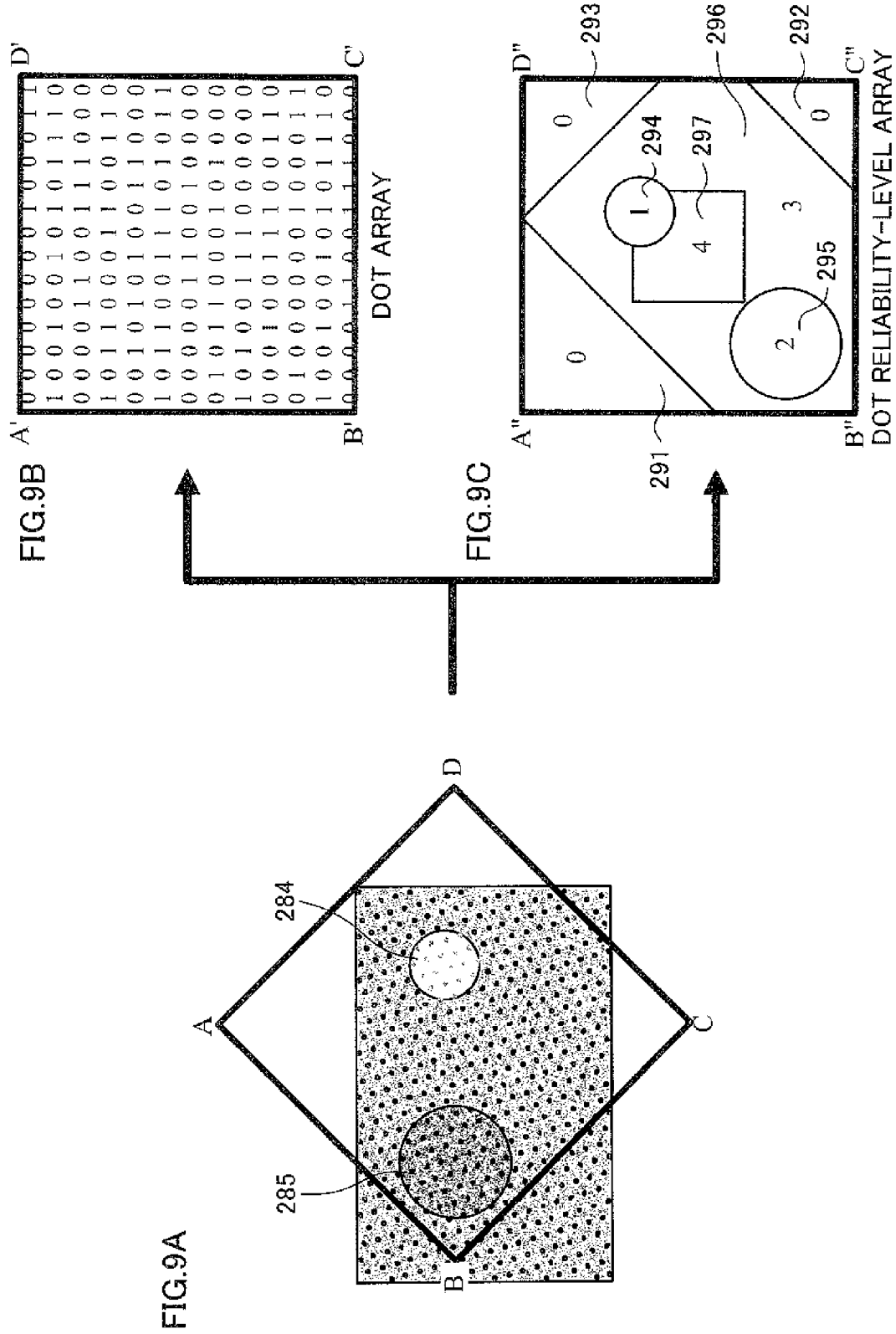

FIG.12

| 64 | 7  | 15 | 14 | 13 | 64 | 8  | 13 | 12 | 6  | 64 | 11 | 10 | 13 | 12 |
|----|----|----|----|----|----|----|----|----|----|----|----|----|----|----|
| 15 | 0  | 32 | 1  | 63 | 15 | 32 | 32 | 33 | 31 | 7  | 0  | 0  | 1  | 31 |
| 15 | 29 | 5  | 0  | 1  | 15 | 61 | 5  | 32 | 33 | 7  | 29 | 3  | 0  | 33 |
| 6  | 38 | 10 | 36 | 0  | 14 | 6  | 10 | 36 | 32 | 14 | 38 | 42 | 36 | 32 |
| 13 | 0  | 0  | 32 | 28 | 5  | 32 | 0  | 32 | 60 | 5  | 0  | 32 | 0  | 60 |
| 64 | 15 | 7  | 6  | 13 | 64 | 8  | 5  | 4  | 14 | 64 | 3  | 2  | 5  | 12 |
| 8  | 32 | 0  | 33 | 31 | 0  | 0  | 0  | 33 | 63 | 0  | 0  | 32 | 1  | 63 |
| 5  | 61 | 1  | 32 | 33 | 5  | 29 | 5  | 32 | 33 | 13 | 29 | 5  | 32 | 1  |
| 4  | 38 | 10 | 36 | 32 | 12 | 38 | 10 | 36 | 32 | 12 | 38 | 10 | 36 | 32 |
| 6  | 32 | 32 | 32 | 28 | 14 | 32 | 32 | 32 | 28 | 14 | 32 | 32 | 32 | 28 |
| 64 | 7  | 15 | 6  | 5  | 64 | 0  | 13 | 12 | 14 | 64 | 3  | 2  | 13 | 12 |
| 11 | 0  | 32 | 33 | 31 | 3  | 32 | 32 | 33 | 31 | 11 | 0  | 32 | 33 | 31 |
| 10 | 61 | 2  | 0  | 33 | 2  | 29 | 5  | 32 | 33 | 10 | 29 | 5  | 32 | 1  |
| 5  | 6  | 42 | 36 | 32 | 13 | 38 | 10 | 36 | 0  | 5  | 6  | 42 | 36 | 0  |
| 4  | 32 | 32 | 0  | 60 | 4  | 0  | 32 | 0  | 28 | 12 | 32 | 0  | 32 | 28 |

| 0 | 0 | 0 | 0 | 0 | 0 | 0 | 0 | 0 | 0 | 0 | 0 | 0 | 0 |
|---|---|---|---|---|---|---|---|---|---|---|---|---|---|
| 0 | 0 | 0 | 0 | 0 | 0 | 0 | 0 | 3 | 0 | 0 | 0 | 0 | 0 |
| 0 | 0 | 0 | 0 | 0 | 0 | 0 | 3 | 3 | 3 | 0 | 0 | 0 | 0 |
| 0 | 0 | 0 | 0 | 0 | 0 | 3 | 3 | 3 | 3 | 3 | 0 | 0 | 0 |
| 0 | 0 | 0 | 0 | 0 | 3 | 3 | 1 | 1 | 1 | 3 | 3 | 0 | 0 |
| 0 | 0 | 0 | 0 | 3 | 4 | 4 | 1 | 1 | 1 | 3 | 3 | 3 | 0 | 0 |
| 0 | 0 | 0 | 3 | 3 | 4 | 4 | 1 | 1 | 1 | 3 | 3 | 3 | 3 | 0 |
| 0 | 0 | 3 | 3 | 3 | 4 | 4 | 4 | 4 | 4 | 3 | 3 | 3 | 3 | 3 |
| 0 | 3 | 3 | 3 | 3 | 4 | 4 | 4 | 4 | 4 | 3 | 3 | 3 | 3 | 3 |
| 3 | 3 | 3 | 3 | 3 | 4 | 4 | 4 | 4 | 4 | 3 | 3 | 3 | 3 | 3 |
| 3 | 2 | 2 | 2 | 2 | 2 | 3 | 3 | 3 | 3 | 3 | 3 | 3 | 3 | 0 |
| 3 | 2 | 2 | 2 | 2 | 2 | 3 | 3 | 3 | 3 | 3 | 3 | 3 | 0 | 0 |
| 3 | 2 | 2 | 2 | 2 | 2 | 3 | 3 | 3 | 3 | 3 | 3 | 0 | 0 | 0 |
| 3 | 2 | 2 | 2 | 2 | 2 | 3 | 3 | 3 | 3 | 3 | 0 | 0 | 0 | 0 |
| 3 | 3 | 3 | 3 | 3 | 3 | 3 | 3 | 3 | 3 | 0 | 0 | 0 | 0 | 0 |

FIG.14A

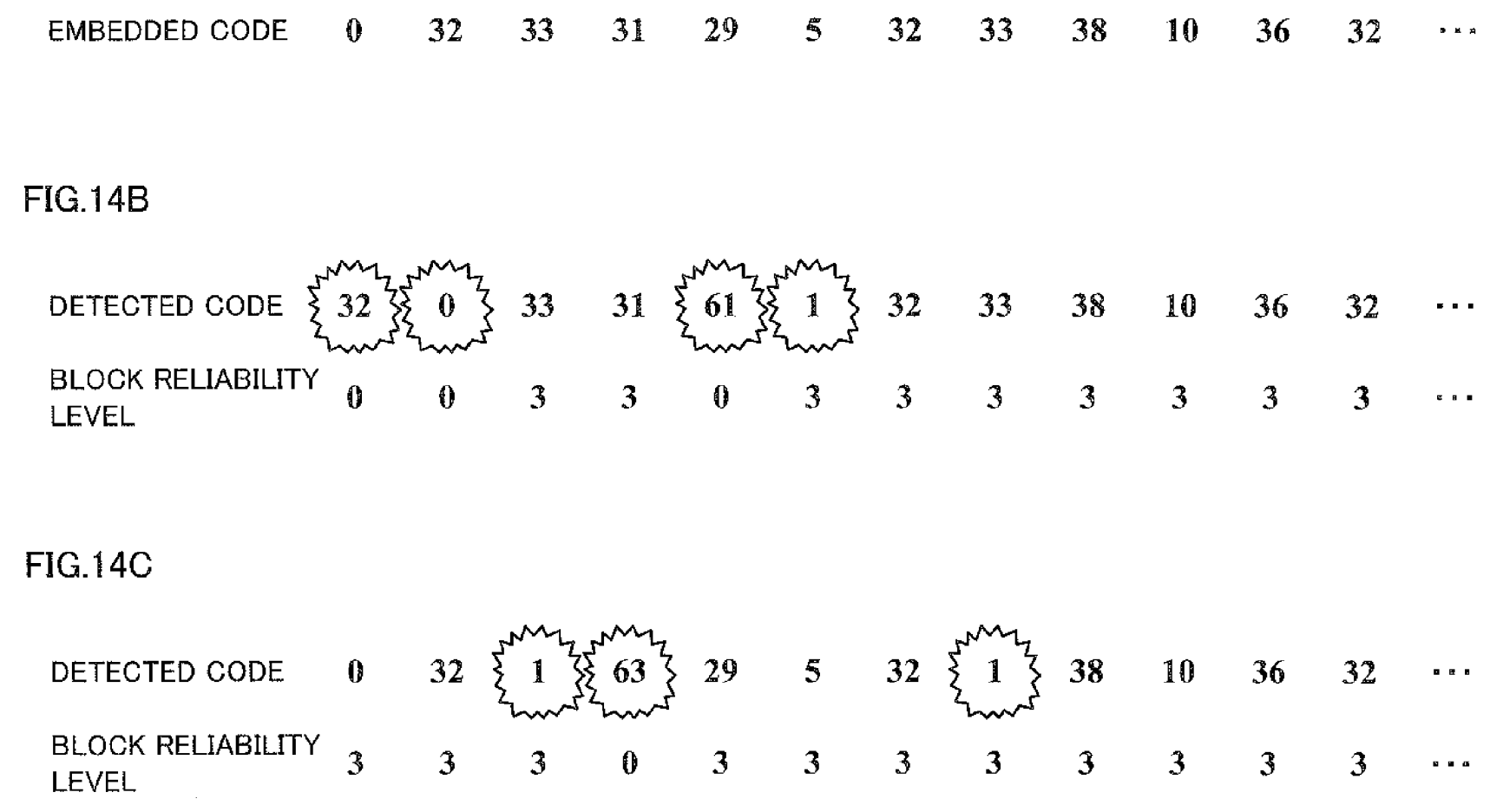

| EMBEDDED CODE | 0 | 32 | 33 | 31 | 29 | 5 | 32 | 33 | 38 | 10 | 36 | 32 | ... |
|---|---|---|---|---|---|---|---|---|---|---|---|---|---|

FIG.14B

| DETECTED CODE | 32 | 0 | 33 | 31 | 61 | 1 | 32 | 33 | 38 | 10 | 36 | 32 | ... |
|---|---|---|---|---|---|---|---|---|---|---|---|---|---|
| BLOCK RELIABILITY LEVEL | 0 | 0 | 3 | 3 | 0 | 3 | 3 | 3 | 3 | 3 | 3 | 3 | ... |

FIG.14C

| DETECTED CODE | 0 | 1 | 63 | 29 | 5 | 32 | 1 | 38 | 10 | 36 | 32 | ... |
|---|---|---|---|---|---|---|---|---|---|---|---|---|
| BLOCK RELIABILITY LEVEL | 3 | 3 | 0 | 3 | 3 | 3 | 3 | 3 | 3 | 3 | 3 | ... |

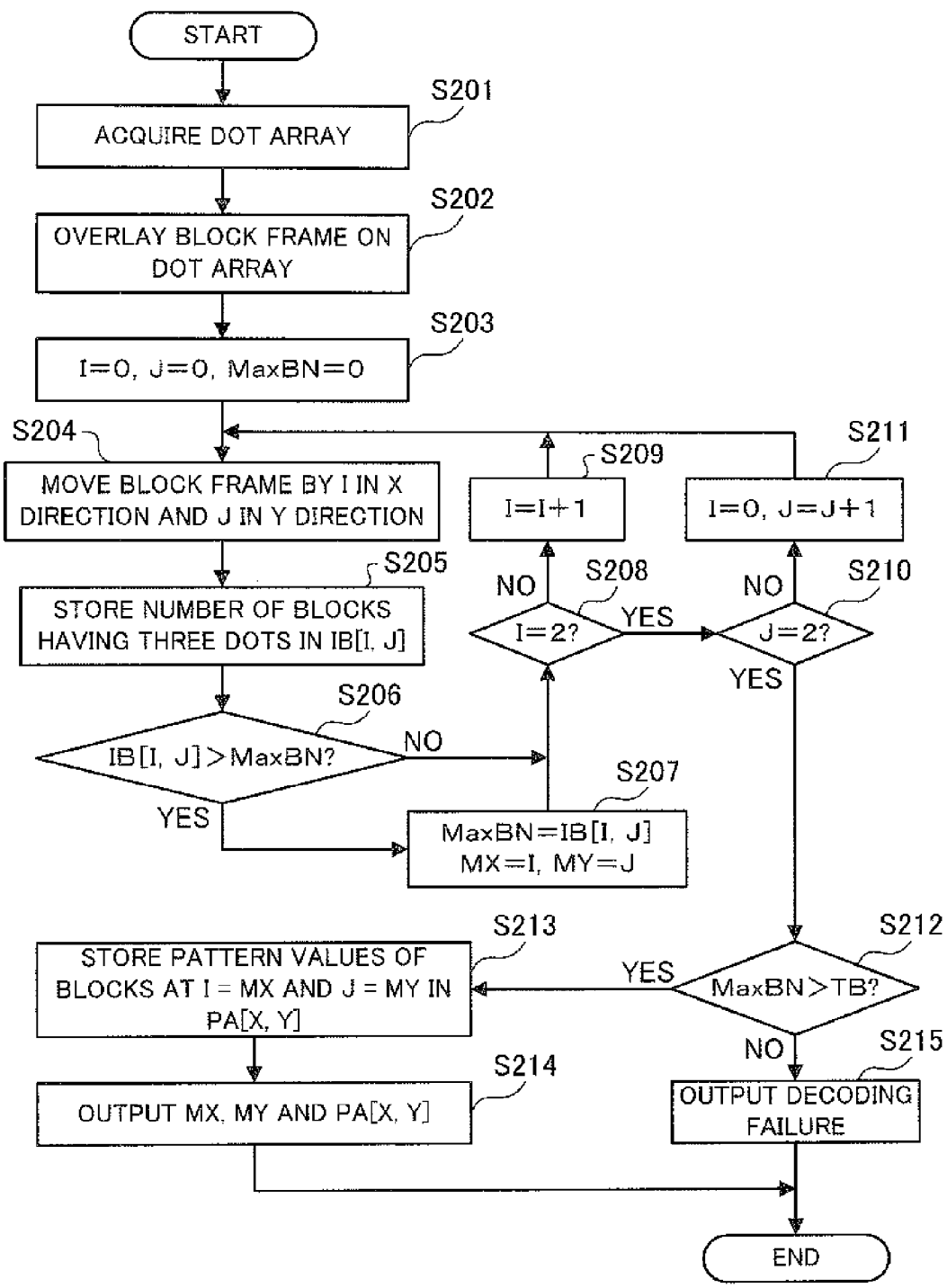

us 8,657,205 B2

IMAGE PROCESSING APPARATUS, IDENTIFICATION APPARATUS, METHOD FOR DETERMINING BIT SEQUENCE AND COMPUTER READABLE MEDIUM

CROSS REFERENCE TO RELATED APPLICATIONS

This application is based on and claims priority under 35 USC §119 from Japanese Patent Application No. 2010-207338 filed Sep. 15, 2010.

BACKGROUND

1. Technical Field

The present invention relates to an image processing apparatus, an identification apparatus, a method for determining a bit sequence and a computer readable medium storing a program.

2. Related Art

A method is known which provides a position code for coding multiple positions on a surface.

A printed material is also known on which first and second coded patterns are recorded as background images, the first coded pattern including image identification information repeatedly formed on a recording material to identify an image formed on the recording material, the second coded pattern including a coordinate value on the recording material.

An image processing apparatus is also known which identifies information embedded as code patterns by reading an image in which a background image and image data are combined. The background image includes blocks, as information units, continuously arranged, and has code patterns, as a background, arranged in the respective blocks, each code pattern including a given number of multiple dots selectively arranged.

SUMMARY

According to an aspect of the present invention, there is provided an image processing apparatus including: an image acquisition unit that acquires an image read from a medium having the image printed thereon, the image representing a specific bit sequence; an information acquisition unit that acquires a state information piece indicating a reading state of the image acquired by the image acquisition unit; a detection unit that detects a bit sequence from the image acquired by the image acquisition unit; and a determination unit that determines the specific bit sequence on the basis of the bit sequence detected by the detection unit and the state information piece acquired by the information acquisition unit.

BRIEF DESCRIPTION OF THE DRAWINGS

Exemplary embodiment(s) of the present invention will be described in detail based on the following figures, wherein:

FIG. 3 is a diagram illustrating an example of every code pattern in the 9C3 method;

FIGS. 4A and 4B are diagrams illustrating examples of the synchronous patterns in the 9C2 and 9C3 methods, respectively;

FIG. 7 is a diagram illustrating an example of a wide-range layout of the code blocks;

FIGS. 9A to 9C are diagrams illustrating the generation of the dot array and the dot reliability-level array;

FIG. 12 is a diagram illustrating an example of a code array;

FIGS. 14A to 14C are diagrams for illustrating an example of usage of the block reliability levels;

FIG. 15 is a flowchart illustrating an exemplary operation of the block detection unit according to the exemplary embodiment;

DETAILED DESCRIPTION

Hereinbelow, an exemplary embodiment of the present invention is described in detail with reference to the attached drawings.

First, a description is given of an encoding method used in the present exemplary embodiment.

The encoding method in the present exemplary embodiment expresses mCn (=m!/{(m−n)!×n!}) pieces of information by using pattern images (hereinafter, referred to as "code patterns") each formed by arranging a unit image in n locations (1≤n<m) selected from m (m≥3) locations. In other words, not one unit image but multiple unit images are associated with information. Associating one unit image with information has a disadvantage that erroneous information is expressed when the unit image is damaged or a noise is added. In contrast, suppose a case of associating two unit images with information, for example. When there are one or three unit images, an error is easily detected. Moreover, in a method in which one unit image expresses one bit or no more than two bits, it is impossible to express a synchronous pattern for controlling the reading of an information pattern, with a pattern visually similar to an information pattern for expressing information. For such reasons, the present exemplary embodiment employs the encoding method described above. Hereinafter, such an encoding method is referred to as an mCn method.

Note that any form of unit image may be used. In the present exemplary embodiment, a dot image (hereinafter, simply referred to as a "dot") is used as an example of the unit image. However, some other form of image may be used, for example, a hatched pattern or the like.

Figure 1A:
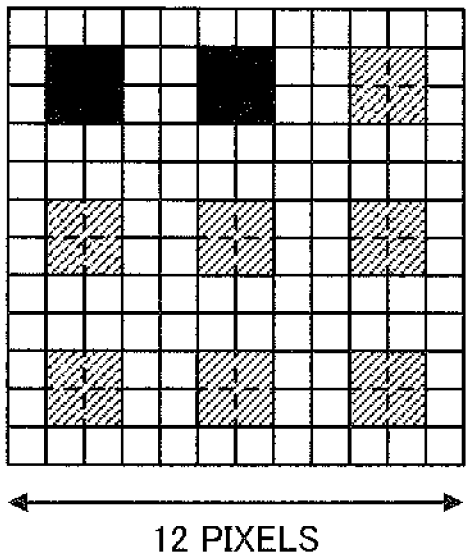
FIGS. 1A and 1B are diagrams illustrating examples of a code pattern in 9C2 and 9C3 methods, respectively.
Figure 1B:
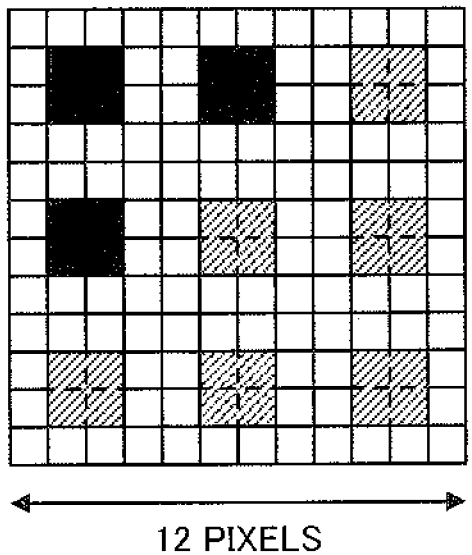

FIGS. 1A and 1B show examples of a code pattern in the mCn method.

In FIGS. 1A and 1B, black areas and hatched areas are dot-arrangeable areas in which dots are arrangeable, while white areas therebetween are areas in which dots are not arrangeable. FIGS. 1A and 1B also show that, among the dot-arrangeable areas, dots are arranged in the black areas and are not arranged in the hatched areas. That is, FIGS. 1A and 1B show examples of providing in total 9 dot-arrangeable areas which are 3 dots in height×3 dots in width. FIG. 1A shows an example of a code pattern in a 9C2 method in which two dots are arranged in two of the nine dot-arrangeable areas, while FIG. 1B shows an example of a code pattern in a 9C3 method in which three dots are arranged in three of the nine dot-arrangeable areas.

However, each of the dots (black areas) arranged in FIGS. 1A and 1B is only for expressing information, and does not coincide with a dot (minimum square in FIGS. 1A and 1B) which is a minimum unit for forming an image. In the present exemplary embodiment, a "dot" indicates the former dot, while the latter dot is referred to as a "pixel." Thus, the dot has a size of 2 pixels by 2 pixels in 600 dpi. Since the length of one side of one pixel in 600 dpi is 0.0423 mm, the length of one side of one dot is 84.6 μm (=0.0423 mm×2). The dot is desirably small, because a larger dot is more recognizable. Nevertheless, a too small dot is not printable by a printer. Hence, the above value which is larger than 50 μm but smaller than 100 μm is employed as the size of the dot. Note that the above value of 84.6 μm is only a calculated value, and an actually printed toner image has a dot of about 100 μm.

Figure 2:
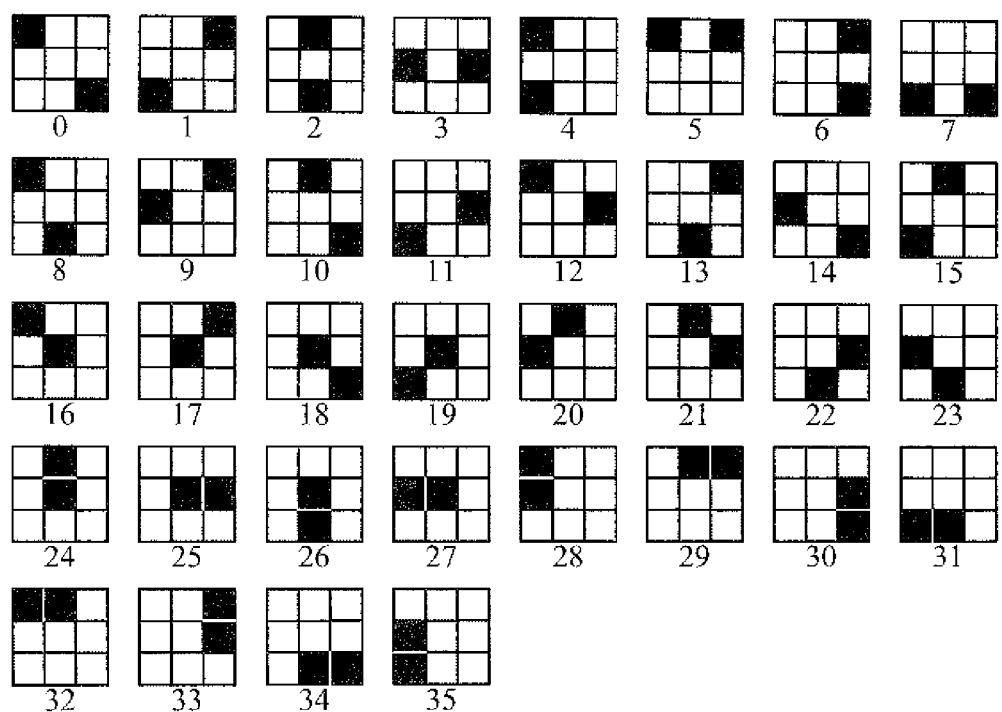
FIG. 2 is a diagram illustrating an example of every code pattern in the 9C2 method.

Next, FIG. 2 shows an example of every code pattern in the 9C2 method. Spaces between the dots are omitted here. As illustrated therein, the 9C2 method utilizes 36 ($=_9C_2$) code patterns. In addition, each of the code patterns is assigned a pattern value which is the number for uniquely identifying the code pattern. FIG. 2 also shows an example of assigning the pattern value to each code pattern. However, the correspondences illustrated in FIG. 2 are only an example. Any pattern value may be assigned to any code pattern.

Moreover, FIG. 3 shows an example of every code pattern in the 9C3 method. Spaces between the dots are also omitted here. As illustrated therein, the 9C3 method utilizes 84 ($=_9C_3$) code patterns. In this case too, each of the code patterns is assigned a pattern value which is the number for uniquely identifying the code pattern. FIG. 3 also shows an example of assigning the pattern value to each code pattern. However, in this case too, the correspondences illustrated in FIG. 3 are only an example. Any pattern value may be assigned to any code pattern.

In these examples, an area in which the code pattern is arranged (hereinafter, referred to as a "pattern block") has a size in which 3 dots×3 dots are arrangeable. However, the size of the pattern block is not limited thereto.

That is, the pattern block may have a size in which 2 dots×2 dots, 4 dots×4 dots, or the like are arrangeable.

In addition, instead of a square, a rectangle may be employed as the pattern block shape as in a case of arranging 3 dots×4 dots, for example, therein. Note that in this specification, a rectangle refers to a rectangular quadrilateral in which two adjacent sides do not have the same length, that is, a rectangular quadrilateral other than a square.

Furthermore, among an arbitrarily determined number of dot-arrangeable areas, the number of areas in which dots are to be arranged may be determined in consideration of the amount of information desired to be expressed and an allowable image density.

As described above, the present exemplary embodiment provides mCn types of code patterns obtained by selecting n locations from m locations. Then, among the code patterns, specific patterns are utilized as information patterns and the others are utilized as synchronous patterns. Here, the information patterns are patterns for expressing information to be embedded in a medium. In contrast, the synchronous patterns are patterns used for extracting the information patterns embedded in the medium. The synchronous patterns are used, for example, to identify the location of the information pattern, or detect rotation of the image. Note that any medium may be used as long as an image is printable thereon. Since paper represents such a medium, the description given below takes paper as the medium. However, the medium may be metal, plastic, fiber, or the like.

Here, a description is given of the synchronous patterns out of the code patterns illustrated in FIG. 2 or 3. When these code patterns are utilized, each of pattern blocks has a shape of a square, and thus it is necessary to recognize images rotated every 90 degrees. Accordingly, four types of code patterns form a set of synchronous patterns.

FIG. 4A is an example of the synchronous patterns in the 9C2 method. Here, among the 36 types of code patterns, 32 types of code patterns are used as the information patterns for expressing 5-bit information, and the remaining 4 types of code patterns form a set of synchronous patterns. For example, a code pattern having a pattern value "32" is used as an upright synchronous pattern; a code pattern having a pattern value "33" is used as a synchronous pattern rotated clockwise by 90 degrees; a code pattern having a pattern value "34" is used as a synchronous pattern rotated clockwise by 180 degrees; and a code pattern having a pattern value "35" is used as a synchronous pattern rotated clockwise by 270 degrees. However, division of the 36 types of code patterns into the information patterns and the synchronous patterns is not limited thereto. For example, 16 types of code patterns may be used as the information patterns for expressing 4-bit information, and the remaining 20 types of code patterns may form 5 sets of the synchronous patterns.

FIG. 4B is an example of the synchronous patterns in the 9C3 method. Here, among the 84 types of code patterns, 64 types of code patterns are used as the information patterns for expressing 6-bit information, and the remaining 20 types of code patterns form 5 sets of synchronous patterns. FIG. 4B shows two of the five sets of synchronous patterns. For example, in the first set, a code pattern having a pattern value "64" is used as an upright synchronous pattern; a code pattern having a pattern value "65" is used as a synchronous pattern rotated clockwise by 90 degrees; a code pattern having a pattern value "66" is used as a synchronous pattern rotated clockwise by 180 degrees; and a code pattern having a pattern value "67" is used as a synchronous pattern rotated clockwise by 270 degrees. In addition, in the second set, a code pattern having a pattern value "68" is used as an upright synchronous pattern; a code pattern having a pattern value "69" is used as a synchronous pattern rotated clockwise by 90 degrees; a code pattern having a pattern value "70" is used as a synchronous pattern rotated clockwise by 180 degrees; and a code pattern having a pattern value "71" is used as a synchronous pattern rotated clockwise by 270 degrees.

If the pattern blocks each have a rectangular shape although illustration thereof is omitted, it is only necessary to provide two types of code patterns as the synchronous patterns for detecting rotation of an image. This is because, for example, in a case of detecting an area in which 4 dots in height×3 dots in width are arrangeable in spite of the necessity of detecting an area in which 3 dots in height×4 dots in width are arrangeable, the detection then shows that the image is rotated by 90 degrees or 270 degrees.

Next, a description is given of a minimum unit of information expression (hereinafter, referred to as a "code block"), the minimum unit being formed by arranging the synchronous pattern and the information patterns.

Figure 5A:
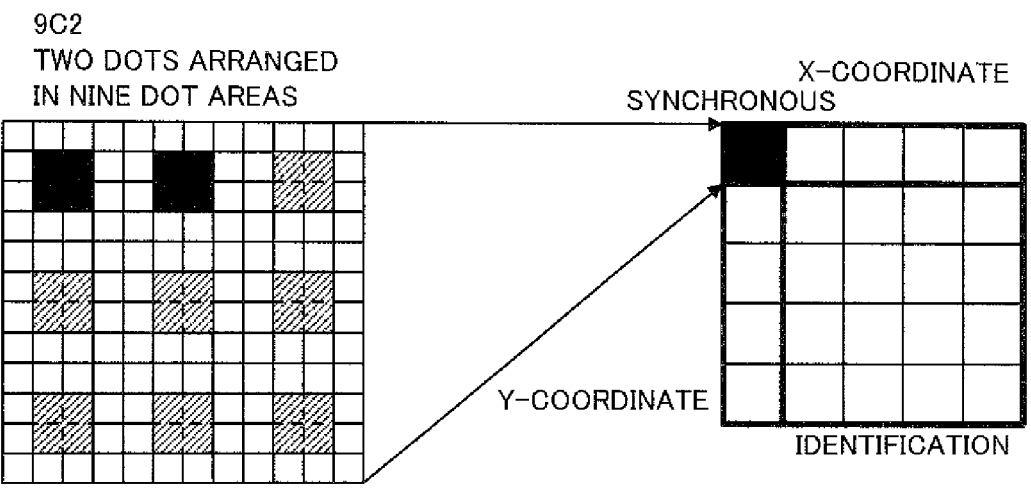
FIGS. 5A and 5B are diagrams illustrating examples of basic layouts of the code blocks.
Figure 5B:
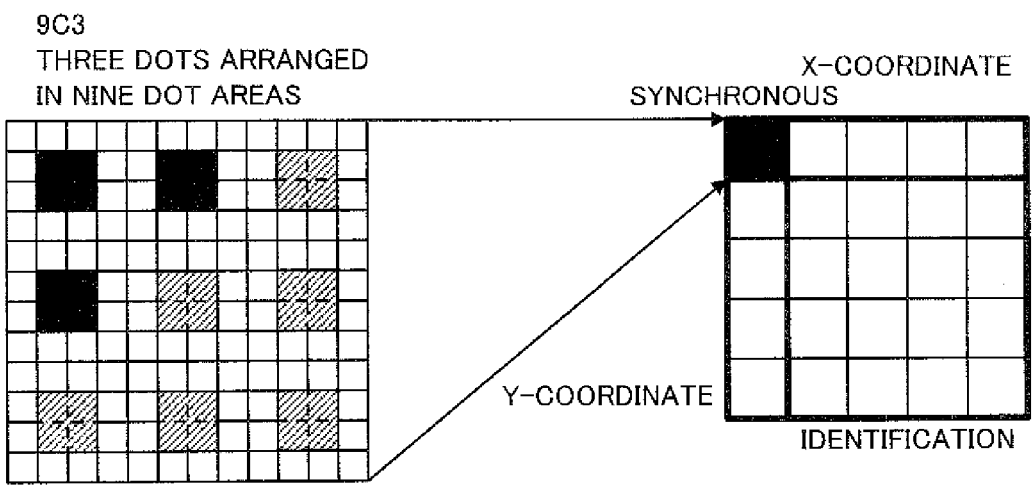

FIGS. 5A and 5B show examples of layouts of the code blocks.

The layouts of the code blocks are shown on the right sides in respective FIGS. 5A and 5B. Here, 25 pattern blocks in a 5×5 arrangement are employed as the layout. Among the 25 pattern blocks, a synchronous pattern is arranged in the top left block. Information patterns each representing X-coordinate information for identifying a coordinate in a horizontal direction on the paper are arranged in the four consecutive blocks on the right of the synchronous pattern. Information patterns each representing Y-coordinate information for identifying a coordinate in a vertical direction on the paper are arranged in the four consecutive blocks under the synchronous pattern. Furthermore, information patterns representing identification information of the paper or a document to be printed on the paper are arranged in 16 blocks surrounded by the information patterns representing the coordinate information.

Meanwhile, FIG. 5A shows on the left side that code patterns in the 9C2 method are arranged in the pattern blocks. That is, the 36 types of code patterns are divided into, for example, the four types of synchronous patterns and the 32 types of information patterns, and the patterns are arranged in accordance with the layout. On the other hand, FIG. 5B shows on the left side that code patterns in the 9C3 method are arranged in the pattern blocks. That is, the 84 types of code patterns are divided into, for example, the 20 types of synchronous patterns and the 64 types of information patterns, and the patterns are arranged in accordance with the layout.

Note that in the present exemplary embodiment, the coordinate information is expressed by using an M-sequence in the vertical and horizontal directions of the paper. The M-sequence is a sequence in which partial sequences thereof do not coincide with each other. For example, an M-sequence in the 11th order is a 2047-bit sequence. Each of partial sequences of 11 bits or more extracted from the 2047-bit sequence is not identical to any other partial sequence in the 2047-bit sequence. In the present exemplary embodiment, one code pattern is associated with four bits. That is, a decimal number is expressed in each four bits of the 2047-bit sequence. The code patterns are determined in accordance with the assignment in FIG. 2 or 3, and printed on the paper in the horizontal and vertical directions thereof. Accordingly, when the code patterns are decoded, three consecutive code patterns are identified, and a table storing correspondences between the code patterns and coordinates are referred to, so that the position of the three consecutive code patterns in the bit sequence is identified.

Figure 6A:
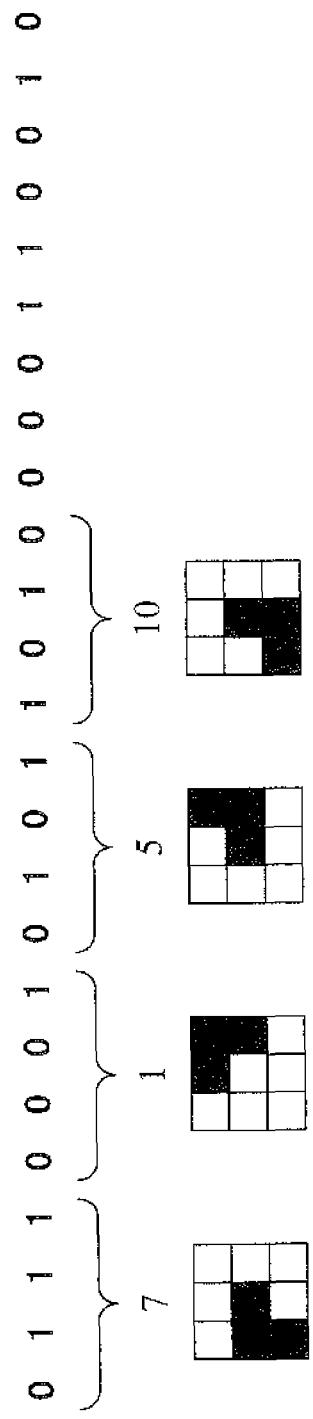
FIGS. 6A and 6B are diagrams for illustrating expression of a coordinate by use of the M-sequence.
Figure 6B:
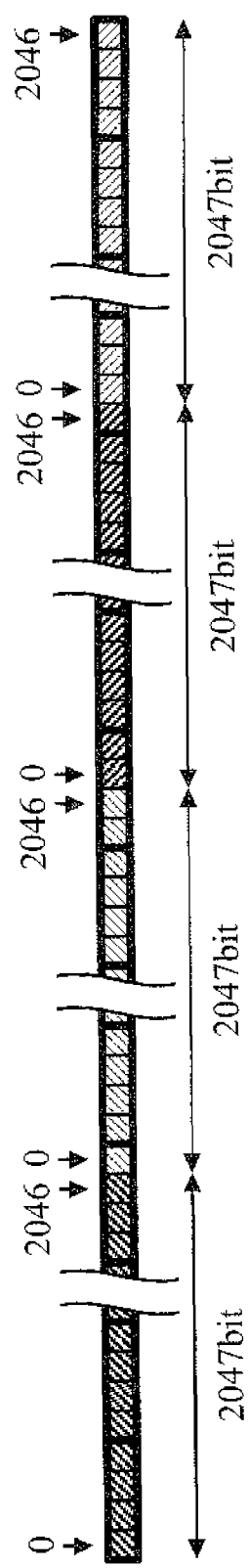

FIGS. 6A and 6B show an example of the encoding of coordinate information using the M-sequence.

FIG. 6A shows a bit sequence "01110001010110100001110010 . . ." taken as an example of the M-sequence in the 11th order. In the present exemplary embodiment, the bit sequence is divided by four bits, and the partial sequences are arranged on the paper. Specifically, the first partial sequence "0111" is arranged as a code pattern having a pattern value "7"; the second partial sequence "0001," a code pattern having a pattern value "1"; the third partial sequence "0101," a code pattern having a pattern value "5"; and the fourth partial sequence "1010," a code pattern having a pattern value "10."

Meanwhile, in the case of dividing the M-sequence by four bits and assigning corresponding code patterns thereto, all the pattern sequences are expressed in four cycles as shown in FIG. 6B. Specifically, since the M-sequence in the 11th order has 2047 bits, as the sequence is divided by four bits and expressed with corresponding code patterns, there is a remainder of three bits in the end. The first one bit of the next M-sequence is added to the three bits to obtain four bits, and expressed with a corresponding code pattern. Furthermore, this M-sequence is divided by four bits starting from the second bit thereof and expressed with corresponding code patterns. Then, the next cycle starts from the third bit of the next M-sequence, and the cycle following that cycle starts from the fourth bit of the further next M-sequence. Further, the fifth cycle starts from the fifth bit, but this cycle corresponds to the first cycle. Therefore, when the M-sequence is divided by four bits in four cycles, all the code sequences may be expressed by using the 2047 code patterns. Since the M-sequence is the 11th-order sequence, three consecutive code patterns do not coincide with any other consecutive code patterns. Hence, decoding may be performed by reading each consecutive three code patterns. However, in the present exemplary embodiment, in consideration of error occurrence, coordinate information is expressed on a four-code-pattern basis.

Although several methods are conceivable to use for encoding the identification information, RS coding is suitable in the present exemplary embodiment. This is because the RS coding is a method of encoding in multiple values, and it is desirable to associate each of the pattern values of code patterns arranged in pattern blocks with corresponding multiple values of an RS code.

The present exemplary embodiment assumes the following usage of the code patterns, for example. Specifically, identification information of a document image is printed on paper while being overlaid on the document image, a partial image on the paper is read with a pen-like scanner, and thereby the identification information of the document image is acquired. In this case, an error occurs due to dirt on the paper or the performance of the scanner. However, the error is corrected with the RS code.

Here, a description is concretely given of correction with the RS code and an information amount which may be expressed in a case of such correction.

The present exemplary embodiment employs code patterns having a fixed number of dots per pattern block, as described above. Accordingly, if a loss or an addition of a dot occurs, the number of dots in the pattern block changes. Thus, this is an error proved to be an error. In contrast, if a loss and an addition of a dot occur simultaneously, the code pattern is wrongly recognized as some other code pattern. This is an error not proved to be an error.

For example, among 16 blocks in which information patterns representing identification information are arranged, 10 blocks are used to arrange the information patterns representing the identification information itself, and six blocks are used for correction thereof. In this case, correction is made in up to six blocks proved to have errors, and also up to three blocks not proved to have errors. When this is implemented, for example, in the 32 types of information patterns in the 9C2 method, information may be expressed in 5 bits per block, and thus identification information itself may be expressed in 50 bits in 10 blocks. In addition, when this is implemented, for example, in the 64 types of information patterns in the 9C3 method, information may be expressed in 6 bits per block, and thus identification information itself may be expressed in 60 bits in 10 blocks.

Next, a description is given of a wide-range layout including the code blocks as described above.

FIG. 7 is a diagram illustrating an example of such a layout. In this layout, code blocks as shown in FIGS. 5A and 5B are arranged as basic units on the entire paper cyclically in the vertical and horizontal directions thereof.

The same code pattern is arranged as a synchronous pattern in the top left pattern block of each code block. The synchronous pattern is denoted by "S" in FIG. 7.

In addition, as X-coordinate information, code patterns having the same arrangement are arranged in the pattern blocks in the same row as for the synchronous pattern. As Y-coordinate information, code patterns having the same arrangement are arranged in the pattern blocks in the same column as for the synchronous pattern. In FIG. 7, the patterns representing the X-coordinate information are denoted by "X01," "X02," . . . , while the patterns representing the Y-coordinate information are denoted by "Y01," "Y002," . . . .

Furthermore, as identification information, code patterns having the same arrangement are arranged cyclically in the vertical and horizontal directions. In FIG. 7, the patterns representing the identification information are denoted by "I01," "I02," . . . "I16."

When such a layout is employed, the identification information and the coordinate information are acquired by performing processing to be described later even if a range including an entire code block in FIG. 5A or 5B is not read as in a case of reading a range encircled in FIG. 7.

A code image printed on the paper in such a layout is formed with a K toner (infrared-light-absorbing toner including carbon) or a special toner by use of an electrophotographic method, for example.

Examples of the special toner include an invisible toner having the maximum absorbance of 7% or less in a visible light region (400 nm to 700 nm) and an absorbance of 30% or more in an near-infra-red region (800 nm to 1000 nm). Note that "visible" and "invisible" have nothing to do with recognizability based on a visual observation. Discrimination between "visible" and "invisible" is made based on whether or not an image formed on a printed medium is recognizable depending on the presence of coloring attributable to absorption of a specific wavelength light in the visible light region. In addition, "invisible" also includes one whose coloring is difficult to be recognized with human eyes although there is some coloring attributable to absorption of a specific wavelength light in the visible light region.

When the code image printed on the paper as described above is read with an image reader, such as a pen device, to decode the information, dots in the read code image are converted into bit information by image processing. At this time, an error might occur due to a blur or a noise, depending on the state of the image. Moreover, in a case where the image reader uses a lighting such as an LED for reading, when the code image printed with a toner by a laser printer or the like is to be read, light from the lighting might be specularly reflected at the toner surface depending on the angle of the image reader, and thus accurate reading might be prevented.

To correct such an error, many methods have been devised and serve as an effective way. However, more accurate decoding is required in a area to be used.

In addition, blurs or noises in the read image are less likely to occur evenly on the image, but more likely to occur locally on a partial area of the image.

Hence, in the present exemplary embodiment, a reliability level is assigned, based on the state of the image, to each bit in an area supposed to have a blur or a noise and utilized together with bit information, and thereby decoding accuracy is enhanced.

Hereinbelow, information decoding using such a reliability level is described in more detail. Although any mCn method may be used in the present exemplary embodiment, the following description is based on use of the 9C3 method, for simplicity. Note that, hereinafter, a pattern block is also referred to simply as a "block."

First, a description is given of an image processing apparatus 20 for reading and processing a code image formed on paper.

Figure 8:
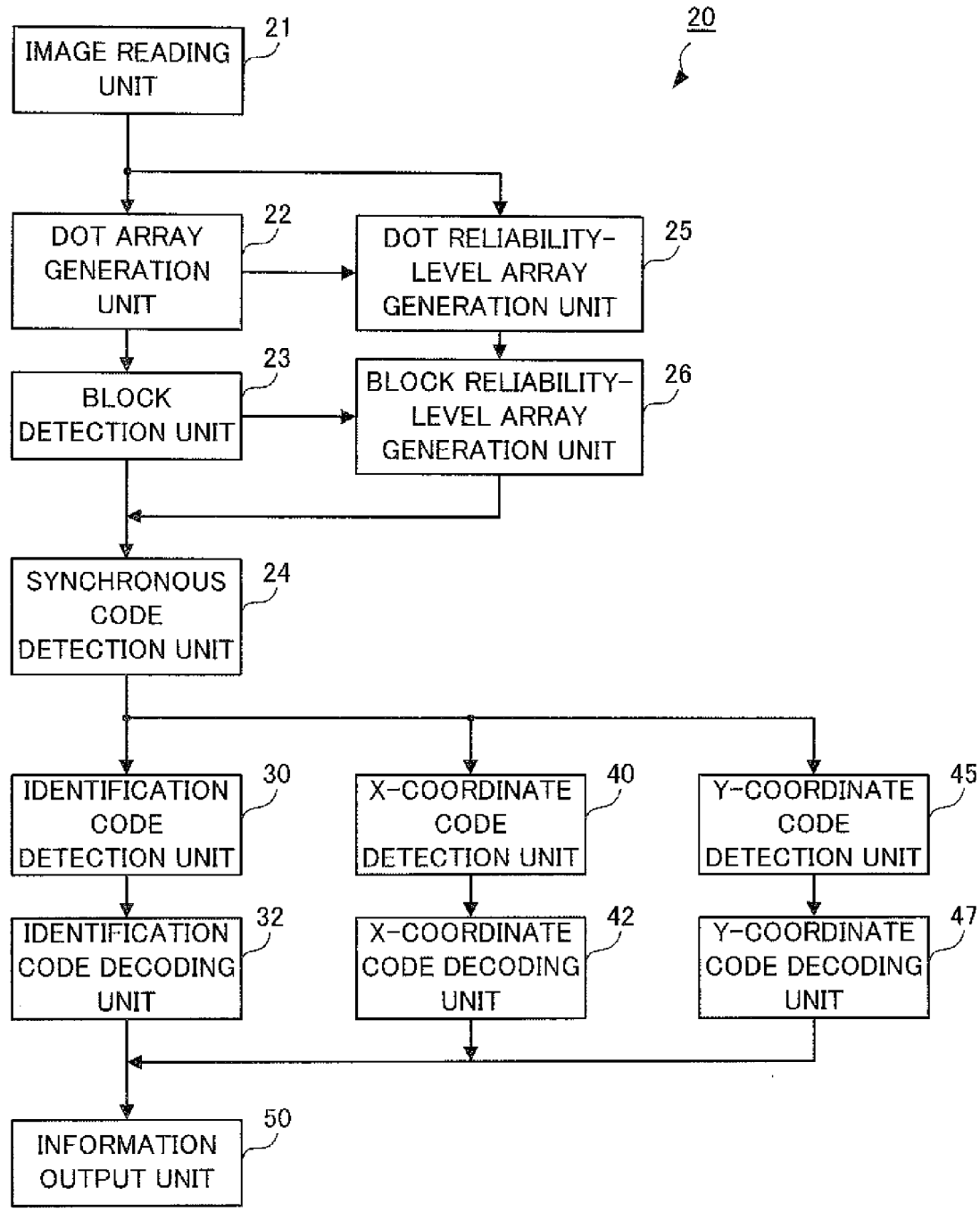
FIG. 8 is a block diagram illustrating an exemplary functional configuration of the image processing apparatus according to the exemplary embodiment.

FIG. 8 is a block diagram illustrating an exemplary configuration of the image processing apparatus 20.

As illustrated therein, the image processing apparatus 20 includes an image reading unit 21, a dot array generation unit 22, a block detection unit 23, a synchronous code detection unit 24, a dot reliability-level array generation unit 25, and a block reliability-level array generation unit 26. The image processing apparatus 20 also includes an identification code detection unit 30, an identification code decoding unit 32, an X-coordinate code detection unit 40, an X-coordinate code decoding unit 42, a Y-coordinate code detection unit 45, a Y-coordinate code decoding unit 47, and an information output unit 50.

The image reading unit 21 reads a code image printed on the paper by using an imaging device such as a charge coupled device (CCD) or a complementary metal oxide semiconductor (CMOS).

The dot array generation unit 22 detects dots from the read code image, refers to positions of the dots, and generates a dot array. Note that processing for eliminating noises included in the read image is also performed as pre-processing of detecting dots from the code image. Here, noises include, for example, a noise which occurs due to variation in imaging device sensitivity or an electronic circuit. Although the type of the noise elimination processing should be determined according to the characteristics of the imaging system, softening processing or sharpening processing such as unsharp masking may be applied. The dot detection is performed in the following manner. Specifically, the image is first separated to a portion of dot images and the other portion of a background image by binary processing, and dot positions are detected based on the respective binary image positions. At this time, since the binary image might include many noise elements, it is necessary that the detection is combined with the filtering processing for judging the presence of a dot based on the area or the shape of the binary image. Then, a dot array is generated by replacing dots detected as an image with digital data on a two-dimensional array in such a manner that a position including a dot is replaced with "1" and a position including no dot is replaced with "0," for example. The present exemplary embodiment provides the dot array generation unit 22 as an example of an image acquisition unit.

The block detection unit 23 detects pattern blocks in a code block in the dot array. Specifically, a block frame is moved over the dot array. The block frame is a frame of the same size and shape as the code block and includes blocks each having the same size and shape as the pattern block. A position at which the blocks have the same number of dots is set as an appropriate frame position. Then, a code array in which pattern values of the blocks are stored is generated. The present exemplary embodiment uses a pattern value as an example of a partial bit sequence corresponding to a partial image.

The synchronous code detection unit 24 refers to the type of each of the code patterns detected from the dot array to detect a synchronous code. The synchronous code detection unit 24 also judges rotation of an image on the basis of the detected synchronous code. For example, if a square code pattern is used, the code pattern has possibly been rotated by a multiple of 90 degrees. Hence, it is checked which one of the four types of synchronous patterns corresponds to the detected synchronous code, and thereby the angle of the code pattern is detected. Meanwhile, if a rectangular code pattern is used, the code pattern has possibly been rotated by a multiple of 180 degrees. Hence, it is checked which one of the two types of synchronous patterns corresponds to the detected synchronous code, and thereby the angle of the code pattern is detected. Furthermore, the synchronous code detection unit 24 rotates blocks in the code array by the rotation angle detected in this manner and thereby sets the code array at a correct angle.

The dot reliability-level array generation unit 25 calculates a reliability level of each dot from the code image read by the image reading unit 21 and the dot array generated by the dot array generation unit 22, and generates a dot reliability-level array. The dot reliability-level array is generated in such a manner that a reliability level of digital data at a certain position in the dot array is arranged on a two-dimensional array of the same size as the dot array, at a position corresponding to the certain position. The present exemplary embodiment uses the reliability level as an example of a state information piece indicating the reading state of an image and provides the dot reliability-level array generation unit 25 as an example of an information acquisition unit that acquires a state information piece.

The block reliability-level array generation unit 26 calculates a reliability level of each pattern block from the dot reliability-level array generated by the dot reliability-level array generation unit 25, and thereby generates a block reliability-level array. Specifically, the block reliability-level array generation unit 26 overlays the block frame on the dot reliability-level array at the appropriate frame position obtained by the block detection unit 23 and then obtains the reliability level of each block on the basis of dot reliability levels of the blocks. Then, the reliability level of a block at a certain position in the code array is arranged on a two-dimensional array of the same size as the code array, at a position corresponding to the certain position, thereby to generate the block reliability-level array. The present exemplary embodiment uses the block reliability level as an example of a partial state information piece indicating a reading state of a partial image.

The identification code detection unit 30 detects identification codes from the code array with the angle thereof corrected, by using the position of the synchronous code as a reference. The present exemplary embodiment uses the identification codes as examples of a bit sequence and provides the identification code detection unit 30 as an example of a detection unit that detects a bit sequence.

The identification code decoding unit 32 decodes the identification codes by using the same parameter as a parameter (such as the number of blocks) used in the coding processing of the RS code described above, and then outputs identification information. The present exemplary embodiment provides the identification code decoding unit 32 as an example of a determination unit that determines a specific bit sequence.

The X-coordinate code detection unit 40 detects X-coordinate codes from the code array with the angle thereof corrected, by using the position of the synchronous code as a reference.

The X-coordinate code decoding unit 42 extracts a partial sequence of the M-sequence from the detected X-coordinate codes, refers to the position of the partial sequence in the M-sequence used for image generation, and outputs a value corrected by using a shift amount of the corresponding code block as X-coordinate information.

The Y-coordinate code detection unit 45 detects Y-coordinate codes from the code array with the angle thereof corrected, by using the position of the synchronous code as a reference.

The Y-coordinate code decoding unit 47 extracts a partial sequence of the M-sequence from the detected Y-coordinate codes, refers to the position of the partial sequence in the M-sequence used for image generation, and outputs a value corrected by using a shift amount of the corresponding code block as Y-coordinate information.

The information output unit 50 outputs the identification information, the X-coordinate information, and the Y-coordinate information acquired from the identification code decoding unit 32, the X-coordinate code decoding unit 42, and the Y-coordinate code decoding unit 47, respectively.

Next, a description is given of an operation at the time of image processing by the image processing apparatus 20.

First, the image reading unit 21 reads a code image of an area of a predetermined size from a medium on which the code image is printed. At this time, if information is to be decoded from one of the code blocks shown in FIG. 5B, it is only necessary to read an area of a size equivalent to the one code block. However, if the information is to be decoded from multiple code blocks, it is necessary to read an area of a size equivalent to the multiple code blocks.

Next, the dot array generation unit 22 generates a dot array. In the dot array, "1" is set at a position at which a dot is detected, and "0" is set at a position at which a dot is not detected.

In addition, the dot reliability-level array generation unit 25 generates a dot reliability-level array. In the dot reliability-level array, reliability levels of dots are set at positions corresponding to the positions at which any one of "1" and "0" is set in the dot array. The reliability levels are herein shown by using five levels from "0" to "4." The reliability level of "0" is the lowest. The larger the value, the higher the reliability level.

FIGS. 9A to 9C are diagrams illustrating the generation of the dot array and the dot reliability-level array.

First, FIG. 9A shows a state of a code image read by the image reading unit 21.

In FIG. 9A, a gray area including dots represents an image taken by an imaging device (hereinafter, referred to as an "imaging-device image") and an area enclosed by a quadrilateral ABCD depicted with a heavy line represents an area read by the image reading unit 21. Of those, the imaging-device image includes a specular reflection area 284 and a blur/noise area 285. The read area is supposed to be an area of a size in which 3×3 code blocks as shown in FIG. 7 are readable at a time (an area having a size of 47 dots×47 dots).

Next, from the read code image, the dot array generation unit 22 generates a dot array in FIG. 9B, and the dot reliability-level array generation unit 25 generates a dot reliability-level array in FIG. 9C. Note that the read area is inclined with respect to a dot arrangement direction in the imaging-device image, but the read area is shown in an upright state in FIGS.

9B and 9C. In other words, A, B, C, and D in FIG. 9A correspond to A', B', C', and D' in FIG. 9B and A", B", C", and D" in FIG. 9C, respectively.

The dot reliability-level array is divided into array elements in each of which the dots have the same reliability level, typically as shown in FIG. 9C. For example, array elements 291, 292, and 293 in areas outside the imaging-device image each have a reliability level of "0". In the imaging-device image, a specular-reflection-area array element 294 has a reliability level of "1," and a blur/noise-area array element 295 has a reliability level of "2." As described above, the read area has a size in which 3×3 code blocks as shown in FIG. 7 are readable at a time. However, there is a case where it is only enough to read one code block as shown in FIG. 5B at a time. In this case, an area including especially clear dots in the imaging-device image is cut out and read. An area cut out for reading one code block in this manner is referred to as a basic area, and an area other than the basic area in the imaging-device image is referred to as an extended area. Then, an extended-area array element 296 has a reliability level of "3," and a basic-area array element 297 has a reliability level of "4."

However, such dot reliability-level arrays are merely a representative example. Actually, the dot reliability-level array generation unit 25 calculates the reliability levels by using a specific algorithm at the time of or after converting a code image into bit information. Hereinbelow, a brief description is given of an example of the dot reliability level calculation.

In the calculation example, the dot reliability-level array generation unit 25 calculates the reliability levels of five levels "0" to "4" on the basis of a distance from each dot to a virtual lattice point thereof and the dot density around each virtual lattice point.

Figure 10A:
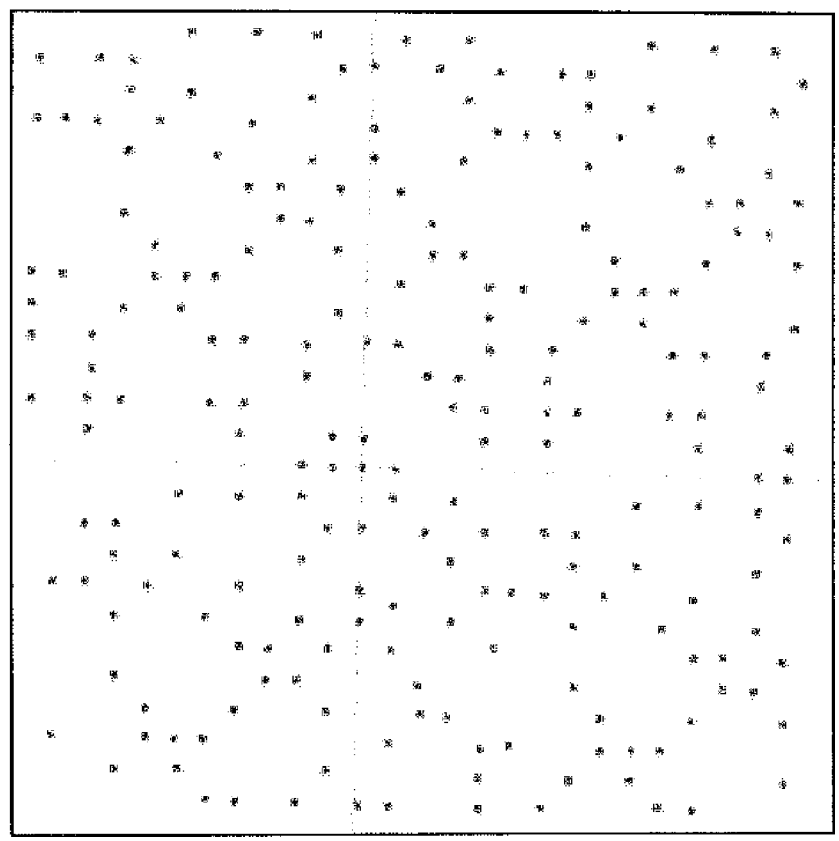
FIGS. 10A and 10B are diagrams illustrating an example of a method of calculating a dot reliability level.

FIG. 10A is a diagram illustrating virtual lattice lines used for calculating the reliability levels. The method of setting the virtual lattice lines is not limited. However, for example, the virtual lattice lines may be set in such a manner that a distance between each adjacent two lines is equal to a predetermined minimum distance between dots and that a sum of squares of a distance from each dot to its nearest line is the smallest.

First, a description is given of a method of calculating a reliability level based on a distance from each dot to a virtual lattice point thereof.

Figure 10B:
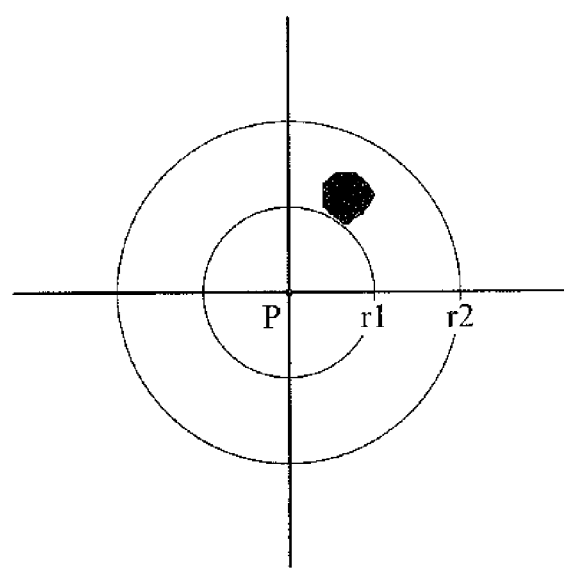

FIG. 10B is a diagram illustrating the method of calculating a reliability level. FIG. 10B shows a local area around a lattice point P.

In the calculation method, if a distance from a dot to the lattice point P is equal to or shorter than r1, for example, that is, if a dot exists inside the smaller circle, a reliability level score of "2" is given. On the other hand, if a distance from a dot to the lattice point P is longer than r1 but not longer than r2, that is, a dot exists outside the smaller circle but inside the larger circle, a reliability level score of "1" is given. Further, if a distance from a dot to the lattice point P is longer than r2, that is, a dot exists outside the larger circle, a reliability level score of "0" is given. In FIG. 10B, a dot exists outside the smaller circle but inside the larger circle, and thus a reliability level score of "1" is given.

Second, a description is given of a method of calculating a reliability level based on the dot density around each virtual lattice point.

In the calculation method, first, an area around a virtual lattice point is focused, the area having a size in which 5 dots×5 dots are arrangeable, for example. Although 25 dots are arrangeable in this area, about eight dots (•25×3/9) are ideally arranged because the arrangement is herein based on the 9C3 method. Hence, for example, if eight dots or more are arranged in the area, a reliability level score of "2" is given. If four to seven dots are arranged in the area, a reliability level score of "1" is given. Furthermore, if no dot or one to two dots are arranged in the area, a reliability level score of "0" is given.

Then, the dot reliability-level array generation unit 25 calculates the reliability levels of the five levels "0" to "4" by adding the reliability level scores obtained by the two calculation methods.

Note that the method of calculating a dot reliability level is not limited to this. The calculation may use, for example, a feature amount of a shape, a size, an image density, a contrast or the like of the dot image or a combination of those multiple feature amounts.

After the dot array and the dot reliability-level array are generated as described above, the block detection unit 23 then detects a borderline of the blocks by overlaying the block frame on the dot array. Note that a block herein is a minimum unit required to decode embedded information as described with reference to FIGS. 5A and 5B. The present exemplary embodiment assumes a code block having 5 blocks×5 blocks. Thus, a block frame used has a size of 5 blocks×5 blocks.

Figure 11:
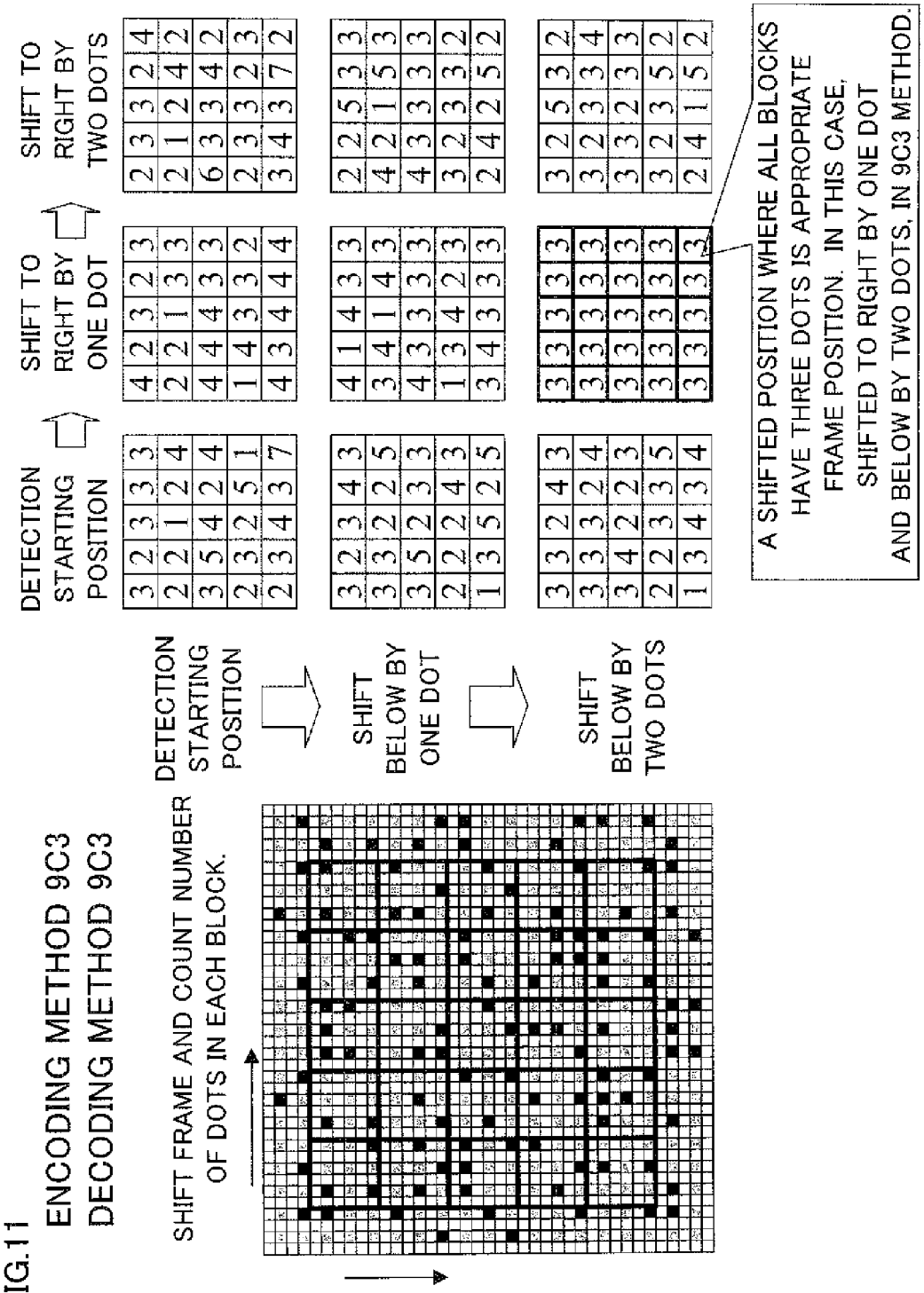
FIG. 11 is a diagram for illustrating processing of detecting blocks on a dot array.

FIG. 11 is a diagram concretely illustrating processing of detecting blocks by moving a block frame. FIG. 11 shows a case where it is known that encoding has been performed by the 9C3 method and thus decoding is performed by the 9C3 method.

First, the block detection unit 23 acquires a dot array from the dot array generation unit 22. The size of the dot array to be acquired here is set in advance and is (the number of blocks required for decoding×the number of dots in one side of a block+the number of dots in one side of a block−1)$^2$. However, since the dot array corresponds to an area of the image selected at random, the position of the block frame is unknown. Hence, first, the blocks are divided by using a corner of the dot array as a reference. Since this example employs m=9, a block frame formed by blocks each having a size of 3 dots×3 dots is overlaid on the dot array. Next, the number of dots in each block is counted. Since this example employs n=3, the block frame is located at an appropriate position if each block has three dots. However, at the first position, the numbers of dots are not even, showing that the position is incorrect. Hence, the block frame is shifted, and then the number of dots in each block is counted. Specifically, the same operation is performed at the starting position, at a position shifted to the right by one dot, and at a position shifted to the right by two dots. In addition, with respect to these positions, the same operation is performed also at the starting position, at a position shifted below by one dot, and at a position shifted below by two dots. As a result, the numbers of dots in all the blocks become "3" at the position where the block frame is shifted to the right by one dot and below by two dots. Thus, this position is set as the appropriate position of the block frame.

This generates a code array in which pattern values of the blocks are stored.

FIG. 12 is a diagram illustrating an example of such a code array. Note that the positions of the identification codes, the X-coordinate codes, and the Y-coordinate codes are unknown at this point of time, because synchronous codes have not been detected. However, borderlines therebetween are conveniently shown in heavy lines so as to show the areas in which these codes are arranged. It is also unknown whether or not it is necessary to rotate the code array, because the synchronous codes have not been detected. However, synchronous codes having a pattern value "64" are conveniently used to show a state where the rotation is not required. Furthermore, the code array is not always one in which the layout in FIG. 5B is arranged in an arrangement of 3 code blocks in height×3 code blocks in width. For example, it is conceivable that a synchronous code is detected in the second block from the top and the second block from the left and that the layout in FIG. 5B is arranged with this synchronous code as a starting point. However, in FIG. 12, the synchronous code is conveniently assumed to be detected in the top left block and, as the code array, one in which the layout in FIG. 5B is arranged in the arrangement of 3 code blocks in height×3 code blocks in width is shown.

As the identification codes, an array of the same pattern value should be arranged repeatedly in the areas each formed of 16 blocks surrounded by the corresponding X-coordinate codes and Y-coordinate codes. However, since the present exemplary embodiment assumes that the read image has a low-reliability portion, FIG. 12 does not show areas in which an array of the same pattern value is repeatedly arranged. Also, as the X-coordinate codes, an array of the same pattern value should be arranged repeatedly in the Y direction, and as the Y-coordinate codes, an array of the same pattern value should be arranged repeatedly in the X direction. However, for the same reason, FIG. 12 does not show areas in which an array of the same pattern value is repeatedly arranged.

Furthermore, in synchronization with the generation of the code array, the block reliability-level array generation unit 26 generates a block reliability-level array in which reliability levels of blocks are stored, from the dot reliability-level array in which reliability levels of the dots are stored.

The present exemplary embodiment sets the lowest reliability level in the dot reliability levels in each block as a block reliability level thereof.

Figures 13A, 13B:
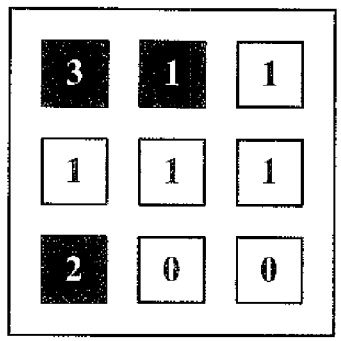
FIGS. 13A and 13B are diagrams illustrating how a block reliability level is obtained and an example of the block reliability-level array, respectively.

FIG. 13A concretely illustrates how such a block reliability level is obtained. In FIG. 13A, among in total 9 dot-arrangeable positions which are 3 dots in height×3 dots in width, black squares represent positions where dots are arranged, while white squares represent positions where no dots are arranged. In addition, numbers in the squares represent dot reliability levels.

Since the reliability levels at the positions where dots are arranged are "3," "1," and "2" in this example, the block reliability level is "1" which is the smallest in these values. There are the dot reliability levels "0" which are smaller than "1." However, this value "0" is the reliability level of the positions where no dots are arranged and thus is not taken into consideration.

FIG. 13B illustrates an example of the block reliability-level array thus obtained. Also in FIG. 13B, as in FIG. 12, heavy lines are conveniently used to show borderlines of areas for arranging the block reliability levels for each of the synchronous codes, the identification codes, the X-coordinate codes, and the Y-coordinate codes. Moreover, an assumption is made that the block reliability-level array is generated from the dot reliability-level array shown in FIG. 9C.

Thereafter, the synchronous code detection unit 24, the identification code detection unit 30, the X-coordinate code detection unit 40, and the Y-coordinate code detection unit 45 detect the synchronous codes, the identification codes, the X-coordinate codes, and the Y-coordinate codes, respectively, by referring to the pattern values in the blocks. Then, the identification code decoding unit 32, the X-coordinate code decoding unit 42, and the Y-coordinate code decoding unit 47 decode the identification codes, the X-coordinate codes, and the Y-coordinate codes, and the information output unit 50 outputs information acquired from the decoding result.

Meanwhile, the present exemplary embodiment utilizes the block reliability levels in such processing.

Here, a description is given of an example of usage of such block reliability levels.

As described above, the present exemplary embodiment uses an RS code which represents an error correction code, in encoding identification information. Specifically, a bit sequence representing identification information is divided into blocks as information blocks, correction blocks for correcting errors of the information blocks are added thereto, and then code patterns corresponding to these blocks are printed. Then, when codes are detected by reading the code patterns, errors of the information blocks are corrected by using the correction blocks. With the RS code, errors of half as many blocks as the correction blocks may be corrected. Further, for blocks proved to have errors, errors of as many blocks as the correction blocks may be corrected.

Hence, the block reliability levels are utilized, and it is assumed that a pattern value of a block having a low block reliability level is an error. Then, a case where a block is proved to have an error is applicable to the correction, and thus the correction performance is enhanced. This makes identification codes decodable with higher accuracy.

Such decoding is described concretely. Here, an assumption is made that there are 6 correction blocks in the 16 blocks in which the identification codes are arranged, that is, errors in 3 blocks are correctable among blocks not proved to have errors, and errors in 6 blocks are correctable among blocks proved to have errors.

FIG. 14A illustrates codes embedded in the paper which are the base of the code array in FIG. 12. FIG. 12 shows the identification codes arranged in a square area of 4 blocks×4 blocks, while FIG. 14A shows these codes arranged in such an order that the first, second, third and fourth rows are arrayed in line from left to right.

Next, processing of detecting the embedded codes is described.

FIG. 14B shows a case where the identification codes are detected from the code block located in the second row from the top and in the first column from the left in FIG. 12. In FIG. 14B, errors occur in four blocks of the first, second, fifth, and sixth blocks, as shown by jagged circles.

Here, suppose that the errors are corrected by simply using the correction blocks, that is, correction is made for a case where blocks are not proved to have errors. In this case, there are four error blocks, while there are six correction blocks. Accordingly, the code sequence in FIG. 14A is not obtained.

On the other hand, suppose that the block reliability levels are used and a code detected from a block having a block reliability level of "0" has an error. In this case, the first, second, and fifth blocks are blocks proved to have errors and thus are correctable by using three correction blocks. The sixth block is a block not proved to have an error, and thus is correctable by using two correction blocks. Accordingly, all the error blocks are correctable by using the six correction blocks, and thus the code sequence in FIG. 14A is obtained.

Note that in this example, the result of correction without utilizing the block reliability levels is different from the result of correction made on the assumption that a block having a low block reliability level has an error. Since it is unknown which one is correct, a configuration may be employed in which such a decoding result is not used in the subsequent processing.

FIG. 14C shows a case where the identification codes are detected from the code block located in the second row from the top and in the third column from the left in FIG. 12. In FIG. 14C, errors occur in three blocks of the third, fourth, and eighth blocks, as shown by jagged circles.

Here, suppose that the errors are corrected by simply using the correction blocks, that is, correction is made for a case where blocks are not proved to have errors. In this case, there are three error blocks, while there are six correction blocks. Accordingly, the code sequence in FIG. 14A is obtained.

On the other hand, suppose that the block reliability levels are used and a code detected from a block having a block reliability level of "0" has an error. In this case, the fourth block is a block proved to have an error and thus is correctable by using one correction block. The third and eighth blocks are blocks not proved to have errors, and thus are correctable by using four correction blocks. Accordingly, all the error blocks are correctable by using the six correction blocks, and thus the code sequence in FIG. 14A is obtained.

Note that in this example, the result of correction without utilizing the block reliability levels is the same as the result of correction made on the assumption that a block having a low block reliability level has an error. This decoding result has a higher reliability level than in a case of performing only decoding without using the block reliability levels, and thus is used in the subsequent processing.

Next, an operation of the image processing apparatus 20 is described in more detail. The description is given on the assumption that code patterns based on the 9C3 method are arranged in the layout in FIG. 5B.

First, an operation of the block detection unit 23 is described.

FIG. 15 is a flowchart illustrating an exemplary operation of the block detection unit 23.

First, the block detection unit 23 acquires a dot array from the dot array generation unit 22 (Step 201). The dot array has a size of (the number of blocks required for decoding×the number of dots in one side of a block+the number of dots in one side of a block −1)$^2$. In the present exemplary embodiment, the number of blocks required for decoding is 5×5, and the number of dots in one side of a block is three. Thus, a 17×17 dot array is acquired.

Next, a block frame is overlaid on the acquired dot array (Step 202). Then, "0" is assigned to counters I and J and MaxBN (Step 203). I and J are provided for counting the number of steps of moving the block frame from the initial position. The block frame is moved in units of one line of an image, and the number of lines based on which the block frame is moved is counted by using the counters I and J. MaxBN is provided to record the largest count value at the time when the number of blocks each having "3" dots detected therein is counted while moving the block frame.

Next, the block detection unit 23 moves the block frame by I in the X direction and J in the Y direction (Step 204). Since I and J are "0," the block frame is not moved in the initial state. Then, the block detection unit 23 counts the number of dots included in each block in the block frame and the number of blocks each having "3" dots. The counted number of blocks are stored in IB[I, J] (Step 205). As I and J in IB[I, J], values of I and J indicating the amounts of moving of the block frame are recorded, respectively.

Next, the block detection unit 23 compares IB[I, J] with MaxBN (Step 206). Since MaxBN has an initial value of "0," IB[I, J] is larger than MaxBN in the first comparison. In this case, a value of IB[I, J] is assigned to MaxBN, while the values of I and J are assigned to MX and MY, respectively (Step 207).

If IB[I, J] is equal to or smaller than MaxBN, the values of MaxBN, MX, and MY are not changed.

Then, the block detection unit 23 judges whether or not I=2 (Step 208).

If not, I is incremented by "1" (Step 209). Thereafter, processing in Steps 204 and 205 is repeated and then IB[I, J] and MaxBN are compared with each other (Step 206).

If IB[I, J] is larger than MaxBN which is the maximum value of IB[I, J] as of the previous processing, the value of IB[I, J] is assigned to MaxBN, and the values of I and J are assigned to MX and MY, respectively (Step 207). If MaxBN is larger than IB[I, J], it is judged whether or not I=2 (Step 208). If I=2, it is then judged whether or not J=2 (Step 210). If not, "0" is assigned to I, and J is incremented by "1" (Step 211). Such procedures are repeated to detect the maximum IB[I, J] in a range of (I, J) from (0, 0) to (2, 2).

When the processing up to I=2 and J=2 is completed, the block detection unit 23 compares the stored MaxBN with a threshold TB (Step 212). The threshold TB is provided to judge whether or not the number of blocks each having "3" dots is allowable for decoding.

If MaxBN is larger than the threshold TB, the block frame is fixed at a position of MX and MY, and the pattern value of each block is detected at the position. Then, the detected pattern value is recorded in a memory as a code array PA[X, Y] together with variables X and Y for identifying each block (Step 213). If conversion into corresponding pattern values may not be made at this time, "−1" which is a value not used as a pattern value is recorded. Then, the block detection unit 23 outputs MX, MY, and the code array PA[X, Y] to the synchronous code detection unit 24 (Step 214).

On the other hand, if MaxBN is equal to or smaller than the threshold TB, it is judged that too large noises in the image prevent decoding, and thus decoding failure is outputted (Step 215).

Meanwhile, when the block detection unit 23 determines the position of the block frame on the code array in this manner, the block reliability-level array generation unit 26 fixes the block frame at the same position on the dot reliability-level array and obtains the reliability level of each block at the position. Then, the block reliability-level array generation unit 26 records the obtained block reliability levels in the memory as a block reliability-level array RA[X, Y] together with the variables X and Y for identifying each block.

Next, an operation of the synchronous code detection unit 24 is described.

Figure 16:
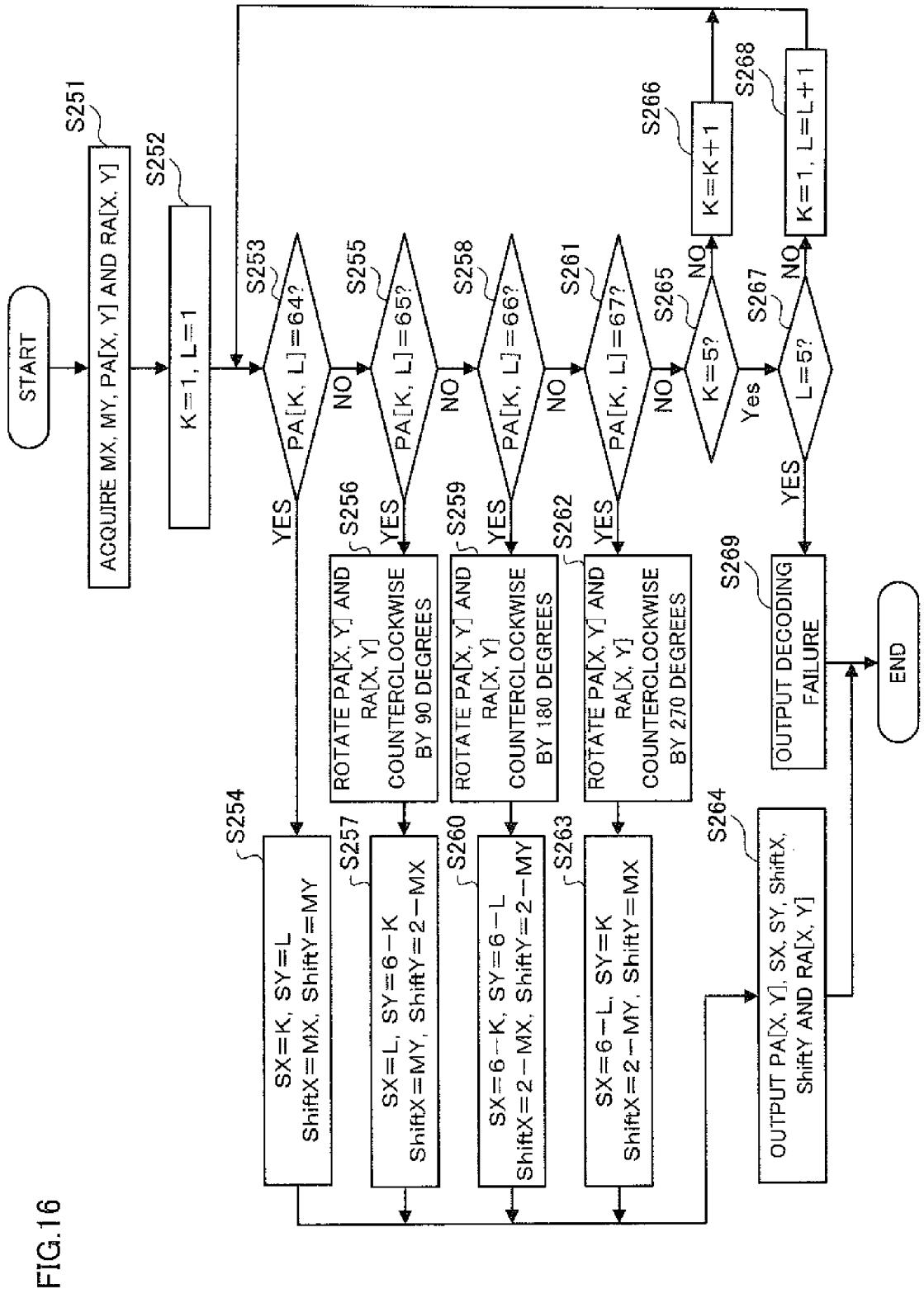
FIG. 16 is a flowchart illustrating an exemplary operation of the synchronous code detection unit according to the exemplary embodiment.

FIG. 16 is a flowchart illustrating an exemplary operation of the synchronous code detection unit 24.

First, the synchronous code detection unit 24 acquires MX, MY, the code array PA[X, Y], and the block reliability-level array RA[X, Y] from the block detection unit 23 (Step 251).

Next, the synchronous code detection unit 24 assigns "1" to each of K and L (Step 252). K is a counter indicating the number of blocks in the X direction, while L is a counter indicating the number of blocks in the Y direction.

Then, the synchronous code detection unit 24 judges whether or not a pattern value of PA[K, L] is "64" (Step 253).

If the pattern value of PA[K, L] is "64," it is judged that rotation of the code array PA[X, Y] and the block reliability-level array RA[X, Y] is not required, and K and L are assigned to an X-coordinate SX and a Y-coordinate SY of a block including a synchronous code, respectively. In addition, MX is assigned to a moving amount ShiftX of the block frame in the X direction, and MY is assigned to a moving amount ShiftY in the Y direction (Step 254).

Next, the synchronous code detection unit 24 judges whether or not the pattern value of PA[K, L] is "65" (Step 255).

If the pattern value of PA[K, L] is "65," the synchronous code detection unit 24 rotates the code array PA[X, Y] and the block reliability-level array RA[X, Y] counterclockwise by 90 degrees (Step 256). As shown in FIG. 4B, the code pattern having the pattern value "65" is an image obtained by rotating a code pattern having a pattern value "64" clockwise by 90 degrees, and thus the image thereof is made upright by rotating the image by 90 degrees in the opposite direction. At this time, all the pattern values in the code array PA[X, Y] are converted into pattern values in the case of rotating the patterns counterclockwise by 90 degrees, and all the reliability levels in the block reliability-level array RA[X, Y] are converted into reliability levels in the case of rotating the patterns counterclockwise by 90 degrees.

In addition, together with the rotation, L is assigned to the X coordinate SX in the block including the synchronous code, and 6-K is assigned to the Y coordinate SY. Also, MY is assigned to the moving amount ShiftX of the block frame in the X direction, and 2-MX is assigned to the moving amount ShiftY in the Y direction (Step 257).

Next, the synchronous code detection unit 24 judges whether or not the pattern value of PA[K, L] is "66" (Step 258).

If the pattern value of PA[K, L] is "66," the synchronous code detection unit 24 rotates the code array PA[X, Y] and the block reliability-level array RA[X, Y] counterclockwise by 180 degrees (Step 259). As shown in FIG. 4B, the code pattern having the pattern value "66" is an image obtained by rotating the code pattern having the pattern value "64" by 180 degrees, and thus the image thereof is made upright by rotating the code pattern having the pattern value "66" by 180 degrees. At this time, all the pattern values in the code array PA[X, Y] are converted into pattern values in the case of rotating the patterns by 180 degrees, and all the reliability levels in the block reliability-level array RA[X, Y] are converted into reliability levels in the case of rotating the patterns by 180 degrees.

In addition, together with the rotation, 6-K is assigned to the X coordinate SX in the block including the synchronous code, and 6-L is assigned to the Y coordinate SY. Also, 2-MX is assigned to the moving amount ShiftX of the block frame in the X direction, and 2-MY is assigned to the moving amount ShiftY in the Y direction (Step 260).

Next, the synchronous code detection unit 24 judges whether or not the pattern value of PA[K, L] is "67" (Step 261).

If the pattern value of PA[K, L] is "67," the synchronous code detection unit 24 rotates the code array PA[X, Y] and the block reliability-level array RA[X, Y] counterclockwise by 270 degrees (Step 262). As shown in FIG. 4B, the code pattern having the pattern value "67" is an image obtained by rotating the code pattern having the pattern value "64" clockwise by 270 degrees, and thus the image thereof is made upright by rotating the image by 270 degrees in the opposite direction. At this time, all the pattern values in the code array PA[X, Y] are converted into pattern values in the case of rotating the patterns counterclockwise by 270 degrees, and all the reliability levels in the block reliability-level array RA[X, Y] are converted into reliability levels in the case of rotating the patterns counterclockwise by 270 degrees.

In addition, together with the rotation, 6-L is assigned to the X coordinate SX in the block including the synchronous code, and K is assigned to the Y coordinate SY. Also, 2-MY is assigned to the moving amount ShiftX of the block frame in the X direction, and MX is assigned to the moving amount ShiftY in the Y direction (Step 263).

Then, if values are assigned to SX, SY, ShiftX, and ShiftY in Step 254, 257, 260 or 263, the synchronous code detection unit 24 outputs PA[X, Y], these values, and RA[X, Y] to the identification code detection unit 30, the X-coordinate code detection unit 40, and the Y-coordinate code detection unit 45 (Step 264).

Meanwhile, if the value of PA[K, L] is not any one of the pattern values "64" to "67," the synchronous code detection unit 24 judges whether or not K=5 (Step 265). If not, K is incremented by "1" (Step 266), and the processing returns to Step 253. If K=5, the synchronous code detection unit 24 judges whether or not L=5 (Step 267). If not, "1" is assigned to K and L is incremented by "1" (Step 268), and then the processing returns to Step 253. In other words, processing in Steps 253 to 264 is repeated while changing the values of K and L until a block having any of the pattern values "64" to "67" is detected. If the block having any of the pattern values "64" to "67" is not detected when K reaches 5 and L reaches 5, a judgment signal indicating decoding failure is outputted (Step 269).

Next, an operation of the identification code detection unit 30 is described.

Figure 17:
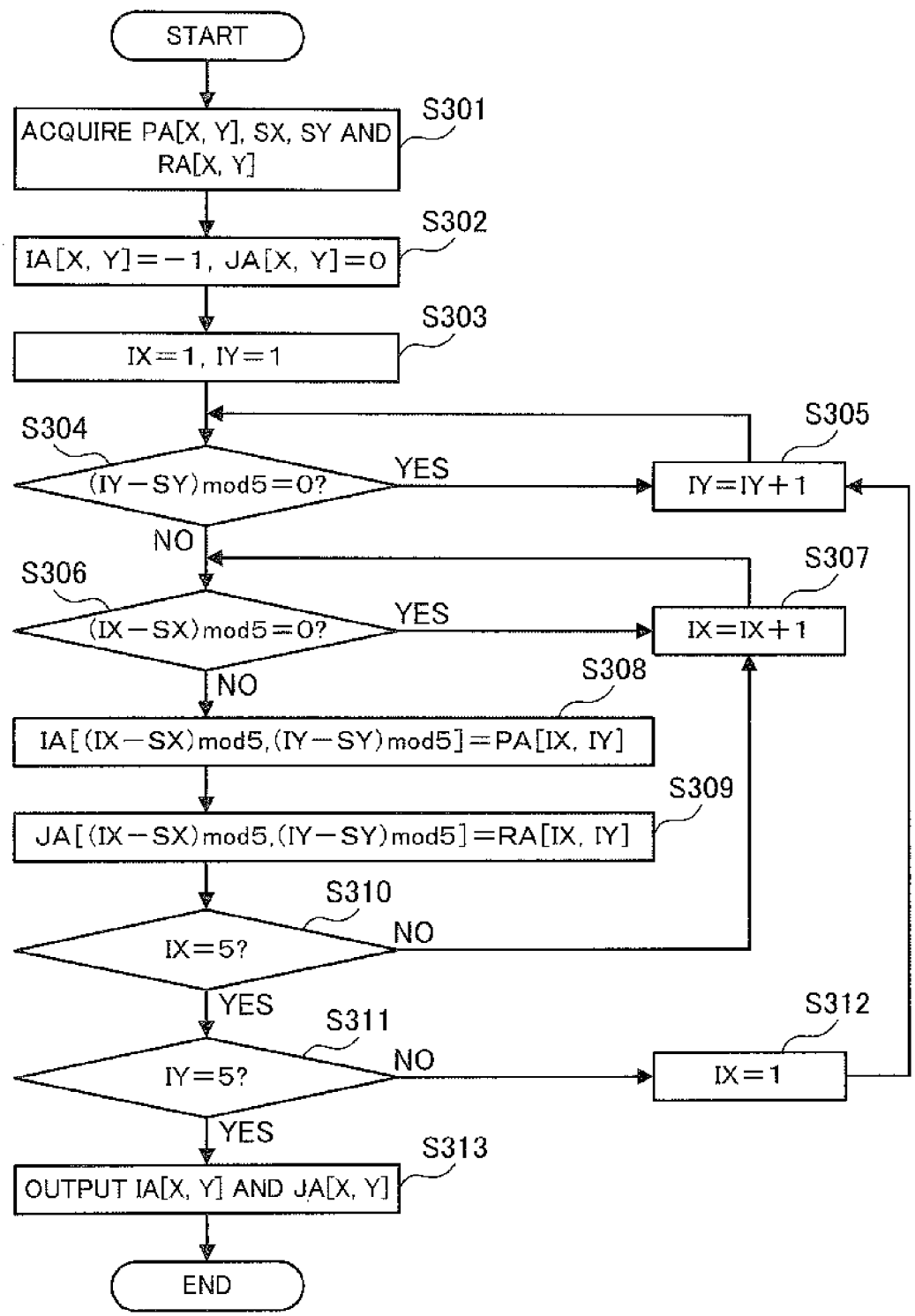
FIG. 17 is a flowchart illustrating an exemplary operation of the identification code detection unit according to the exemplary embodiment.

FIG. 17 is a flowchart illustrating an exemplary operation of the identification code detection unit 30.

First, the identification code detection unit 30 acquires the code array PA[X, Y], SX, SY, and the block reliability-level array RA[X, Y] from the synchronous code detection unit 24 (Step 301).

Next, the identification code detection unit 30 initializes all the elements in an identification code array IA[X, Y] to "−1" and all the elements in an identification code reliability-level array JA[X, Y] to "0" (Step 302). The value "−1" is a number which has not been used as a pattern value. Then, "1" is assigned to counters IX and IY for identifying each block in each code block (Step 303). IX is a counter indicating the number of blocks in the X direction, while IY is a counter indicating the number of blocks in the Y direction.

The identification code detection unit 30 judges whether or not IY-SY is divisible by "5" (Step 304). In other words, the identification code detection unit 30 judges whether or not a synchronous code is arranged in a row identified by IY.

If IY-SY is divisible by 5, that is, if a synchronous code is arranged in the row, IY is incremented by "1" (Step 305) because an identification code needs not to be extracted in the block. Then, the processing proceeds to Step 304.

On the other hand, if IY-SY is not divisible by 5, that is, if a synchronous code is not arranged in the row, the identification code detection unit 30 judges whether or not IX-SX is divisible by 5 (Step 306). In other words, the identification code detection unit 30 judges whether or not a synchronous code is arranged in a column identified by IX.

If IX-SX is divisible by 5, that is, if a synchronous code is arranged in the column, IX is incremented by "1" (Step 307) because an identification code needs not to be extracted in the block. Then, the processing proceeds to Step 306.

On the other hand, if IX-SX is not divisible by 5, that is, if a synchronous code is not arranged in the column, the identification code detection unit 30 assigns PA[IX, IY] to IA[(IX-SX) mod 5, (IY-SY) mod 5] (Step 308), and RA[IX, IY] to JA[(IX-SX) mod 5, (IY-SY) mod 5] (Step 309).

Then, the identification code detection unit 30 judges whether or not IX=5 (Step 310).

If not, IX is incremented by "1" (Step 307), the processing in Steps 306 to 309 is repeated until IX reaches 5. When IX reaches 5, the identification code detection unit 30 next judges whether or not IY=5 (Step 311). If not, "1" is assigned to IX (Step 312), IY is incremented by "1" (Step 305), and the processing in Steps 304 to 310 is repeated until IY reaches 5.

If IY reaches 5, the identification code detection unit 30 outputs IA[X, Y] and JA[X, Y] (Step 313).

Next, an operation of the identification code decoding unit 32 is described. The identification code decoding unit 32 performs processing utilizing the identification code reliability-level array JA[X, Y]. The description is given of a case of, as an example, verifying a result obtained in ordinary correction with the RS code, by using a result obtained in correction where a pattern value of a block having a low block reliability level is assumed to have an error, as described with reference to FIGS. 14B and 14C. The number of correction blocks is six, but is not limited thereto.

Figure 18:
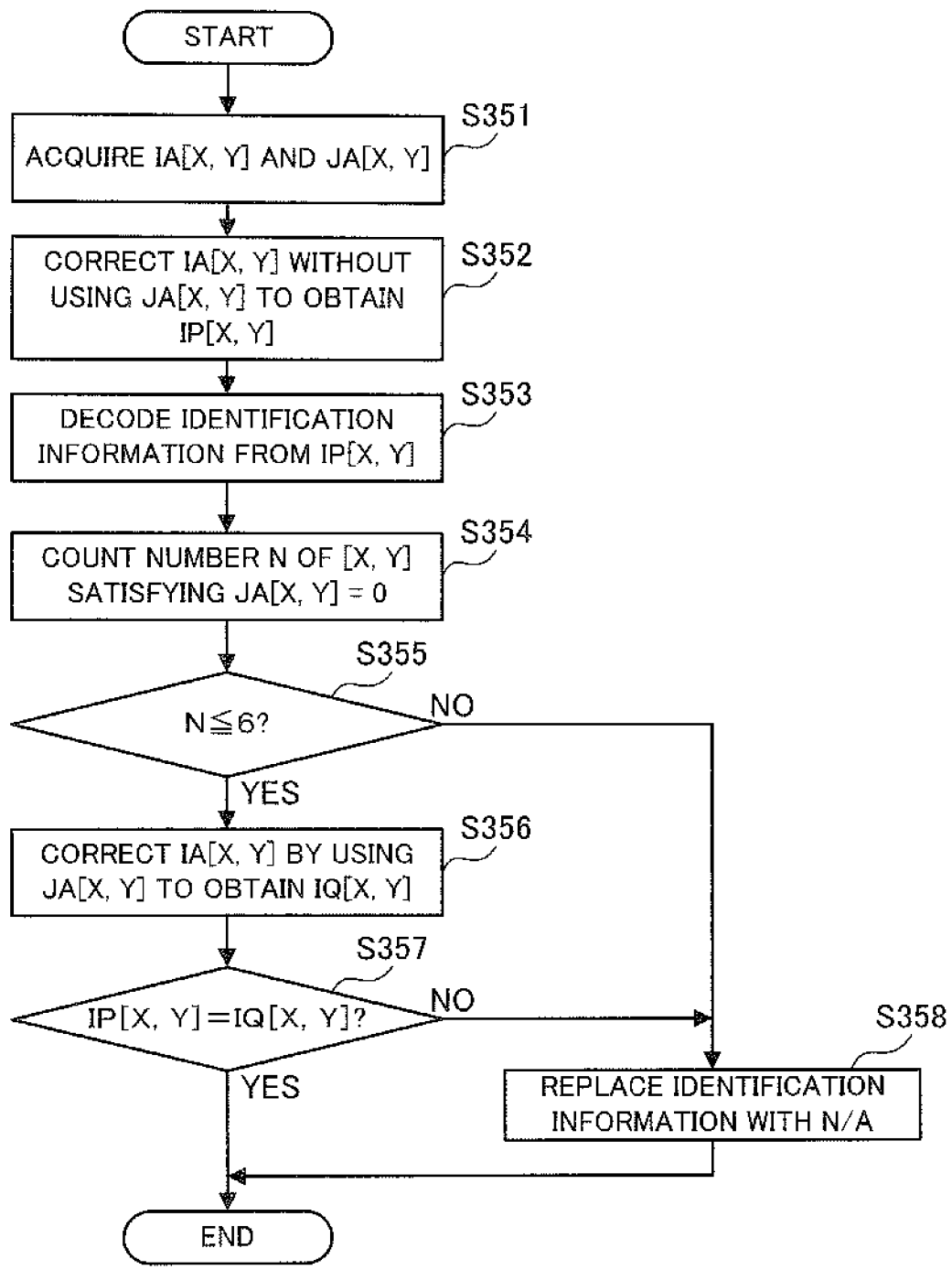
FIG. 18 is a flowchart illustrating an exemplary operation of the identification code decoding unit according to the exemplary embodiment.

FIG. 18 is a flowchart illustrating an exemplary operation of the identification code decoding unit 32.

First, the identification code decoding unit 32 acquires the identification code array IA[X, Y] and the identification code reliability-level array JA[X, Y] from the identification code detection unit 30 (Step 351).

Next, the identification code decoding unit 32 performs error correction on the identification code array IA[X, Y] without using the identification code reliability-level array JA[X, Y], thereby to obtain IP[X, Y] (Step 352). In other words, the identification code decoding unit 32 performs the ordinary correction with the RS code by using the six correction blocks.

Then, the identification code decoding unit 32 decodes IP[X, Y] to obtain identification information (Step 353).

Thereafter, the identification code decoding unit 32 verifies IP[X, Y] by using the identification code reliability-level array JA[X, Y].

Specifically, the identification code decoding unit 32 first counts the number N of sets of [X, Y] satisfying JA[X, Y]=0 (Step 354). In other words, the identification code decoding unit 32 counts the number of blocks having the block reliability level of "0" in the 16 blocks in which the identification codes are arranged. Then, the identification code decoding unit 32 judges whether or not N is equal to or less than "6" (Step 355).

If the identification code decoding unit 32 judges that N is equal to or less than "6," that is, if the number of blocks having the block reliability level of "0" is equal to or less than "6," the identification code decoding unit 32 performs error correction on the identification code array IA[X, Y] by using the identification code reliability-level array JA[X, Y], thereby to obtain IQ[X, Y] (Step 356). In other words, the identification code decoding unit 32 assumes the blocks having the block reliability level of "0" as error blocks and performs correction by using the six correction blocks.

Next, the identification code decoding unit 32 judges whether or not IP[X, Y] coincides with IQ[X, Y] (Step 357). If the identification code decoding unit 32 judges that IP[X, Y] coincides with IQ[X, Y], the identification code decoding unit 32 judges that the identification information acquired in Step 353 has high reliability and terminates the processing.

On the other hand, if the identification code decoding unit 32 judges that N is not equal to or less than 6 in Step 355, that is, if the number of blocks having the block reliability level of "0" exceeds "6," the identification code decoding unit 32 replaces the identification information acquired in Step 353 with N/A (Step 358). This is because the blocks are not correctable by using the correction blocks even if the blocks are all assumed to be error blocks.

If the identification code decoding unit 32 judges that IP[X, Y] do not coincide with IQ[X, Y] in Step 357, the identification code decoding unit 32 judges that the identification information acquired in Step 353 has low reliability and replaces the identification information acquired in Step 353 with N/A (Step 358).

In this exemplary operation, a pattern value detected in a block having the block reliability level of "0" is assumed to be an error, but the assumption is not limited thereto. For example, a pattern value detected in a block having a block reliability level of a predetermined value indicating an unfavorable state may be assumed to have an error.

Meanwhile, in this example, a result obtained in the ordinary correction with the RS code is verified by using a result obtained in the correction where a pattern value of a block having a low block reliability level is assumed to have an error. However, processing using the block reliability level is not limited thereto. Any processing may be used as long as an identification code is decoded based on a result obtained in ordinary correction with the RS code and a result obtained in correction where a pattern value of a block having a lower block reliability level is assumed to have an error.

Next, operations of the X-coordinate code detection unit 40 and the X-coordinate code decoding unit 42 are described.

Figure 19:
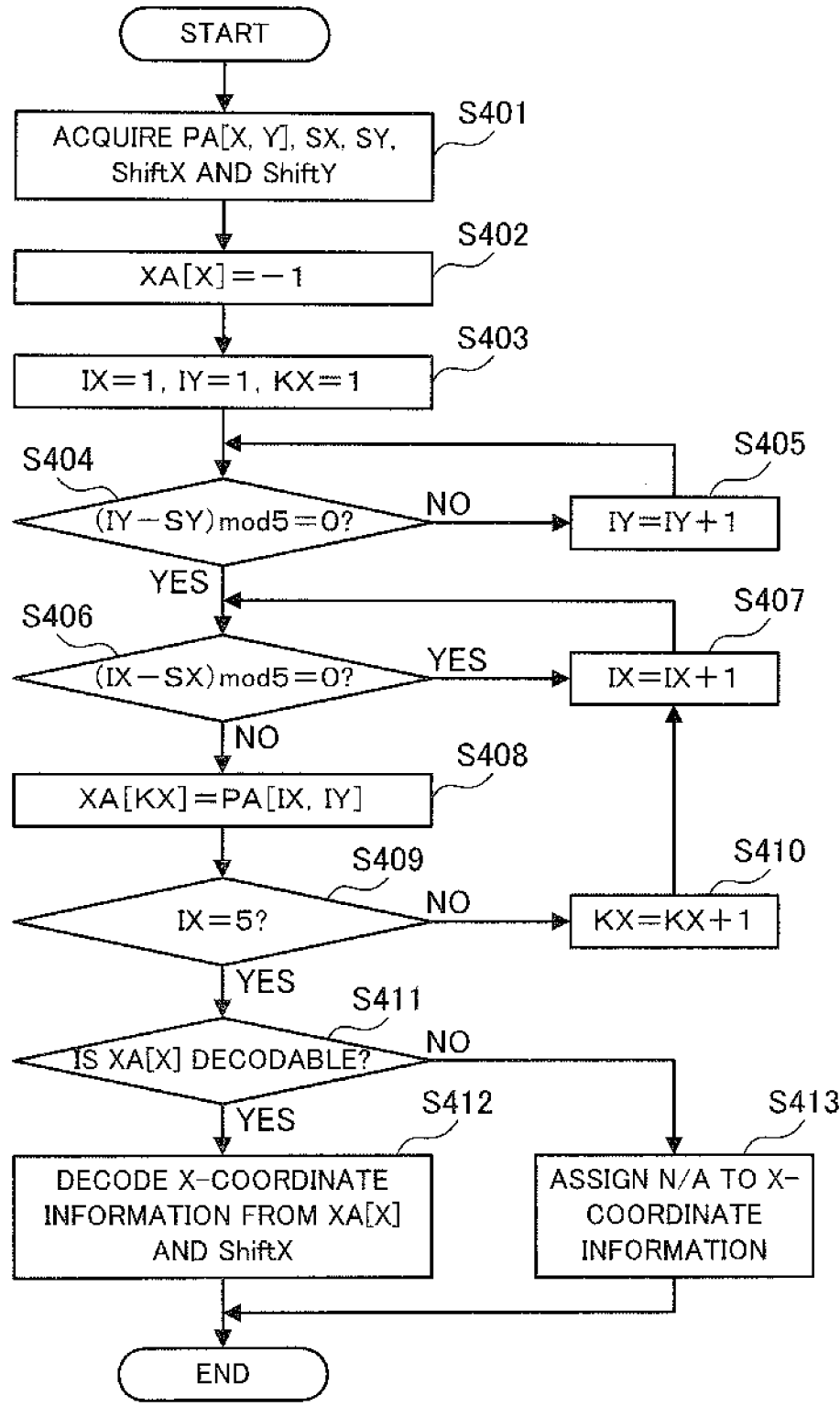
FIG. 19 is a flowchart illustrating exemplary operations of the X-coordinate code detection unit and the like according to the exemplary embodiment.

FIG. 19 is a flowchart illustrating exemplary operations of the X-coordinate code detection unit 40 and the X-coordinate code decoding unit 42.

First, the X-coordinate code detection unit 40 acquires the code array PA[X, Y], SX, SY, ShiftX, and ShiftY from the synchronous code detection unit 24 (Step 401).

Next, the X-coordinate code detection unit 40 initializes all the elements in an X-coordinate code array XA[X] to "−1" (Step 402). The value "−1" is a number which has not been used as a pattern value. Then, "1" is assigned to counters IX and IY for identifying each block in each code block. IX is a counter indicating the number of blocks in the X direction, while IY is a counter indicating the number of blocks in the Y direction. The X-coordinate code detection unit 40 further assigns "1" to a counter KX for identifying each element in the X-coordinate code array (Step 403).

Then, the X-coordinate code detection unit 40 judges whether or not IY-SY is divisible by "5" (Step 404). In other words, the X-coordinate code detection unit 40 judges whether or not a synchronous code is arranged in a row identified by IY.

If IY-SY is not divisible by 5, that is, if a synchronous code is not arranged in the row, IY is incremented by "1" (Step 405) because an X-coordinate code needs not to be extracted in the block. Then, the processing proceeds to Step 404.

On the other hand, if IY-SY is divisible by 5, that is, if a synchronous code is arranged in the row, the X-coordinate code detection unit 40 judges whether or not IX-SX is divisible by "5" (Step 406). In other words, the X-coordinate code detection unit 40 judges whether or not a synchronous code is arranged in a column identified by IX.

If IX-SX is divisible by 5, that is, if a synchronous code is arranged in the column, IX is incremented by "1" (Step 407) because an X-coordinate code needs not to be extracted in the block. Then, the processing proceeds to Step 406.

On the other hand, if IX-SX is not divisible by 5, that is, if a synchronous code is not arranged in the column, the X-coordinate code detection unit 40 assigns PA[IX, IY] to XA[KX] (Step 408).

Then, the X-coordinate code detection unit 40 judges whether or not IX=5 (Step 409).

If not, KX is incremented by "1" (Step 410), IX is incremented by "1" (Step 407), and the processing in Steps 406 to 408 is repeated until IX reaches 5. When IX reaches 5, the processing is passed on to the X-coordinate code decoding unit 42.

Specifically, the X-coordinate code decoding unit 42 judges whether or not XA[X] is decodable (Step 411).

If the X-coordinate code decoding unit 42 judges that XA[X] is decodable, the X-coordinate code decoding unit 42 decodes X-coordinate information from XA[X] and ShiftX (Step 412). If the X-coordinate code decoding unit 42 judges that XA[X] is not decodable, the X-coordinate code decoding unit 42 assigns N/A to the X-coordinate information (Step 413).

Although the description has been given of only the operations of the X-coordinate code detection unit 40 and the X-coordinate code decoding unit 42, the Y-coordinate code detection unit 45 and the Y-coordinate code decoding unit 47 also perform similar operations.

This is the end of the description of the operation of the image processing apparatus 20 according to the present exemplary embodiment.

Next, a description is concretely given of a hardware configuration of the image processing apparatus 20 according to the present exemplary embodiment.

First, a description is given of a pen device 60 that is an example of an identification apparatus and implements the image processing apparatus 20.

Figure 20:
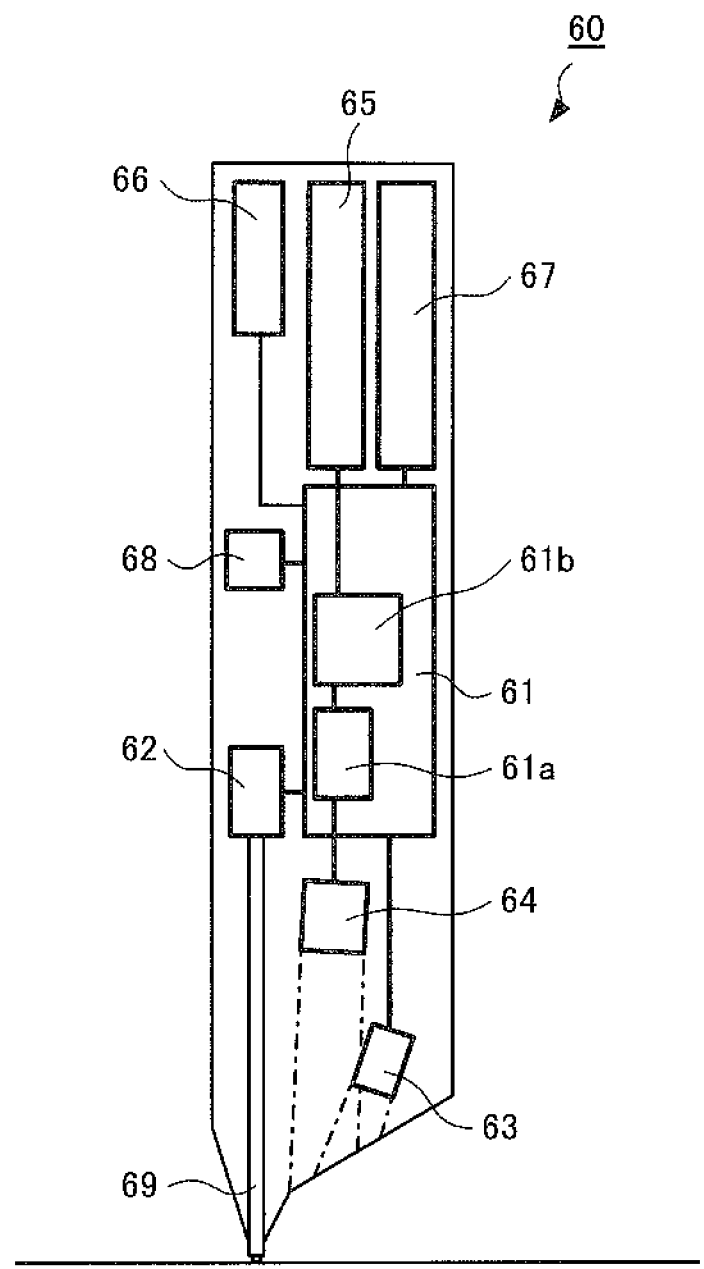
FIG. 20 is a diagram illustrating a mechanism of a pen device that is capable of implementing the image processing apparatus according to the exemplary embodiment.

FIG. 20 is a diagram illustrating a mechanism of the pen device 60.

As illustrated therein, the pen device 60 includes a control circuit 61 that controls an operation of the whole pen. The control circuit 61 also includes an image processing unit 61a that processes code images detected from an input image and a data processing unit 61b that extracts identification information and coordinate information based on the processing results of the image processing unit 61a.

In addition, the control circuit 61 is connected with a pressure sensor 62 that detects a writing operation with the pen device 60 by means of pressure applied to a pen tip 69. The control circuit 61 is also connected with an infrared LED 63 that irradiates a medium with infrared light, and an infrared CMOS 64 that is an example of a reading unit and inputs an image. Furthermore, the control circuit 61 is connected with: an information memory 65 for storing the identification information and the coordinate information; a communication circuit 66 that is an example of an output unit and transmits the identification information and the coordinate information to an external device; a battery 67 for driving the pen; and a pen ID memory 68 that stores identification information of the pen (a pen ID).

Note that the image reading unit 21 shown in FIG. 8 is implemented with the infrared CMOS 64 in FIG. 20, for example. Meanwhile, the dot array generation unit 22 and the dot reliability-level array generation unit 25 are implemented with the image processing unit 61a in FIG. 20, for example. Furthermore, the block detection unit 23, the synchronous code detection unit 24, the block reliability-level array generation unit 26, the identification code detection unit 30, the identification code decoding unit 32, the X-coordinate code detection unit 40, the X-coordinate code decoding unit 42, the Y-coordinate code detection unit 45, the Y-coordinate code decoding unit 47, and the information output unit 50 which are shown in FIG. 8 are implemented with the data processing unit 61b in FIG. 20, for example.

Processing implemented by the image processing unit 61a or the data processing unit 61b in FIG. 20 may be implemented by a general purpose computer, for example. Thus, a description is given of a hardware configuration of a computer 90 for implementing such processing.

Figure 21:
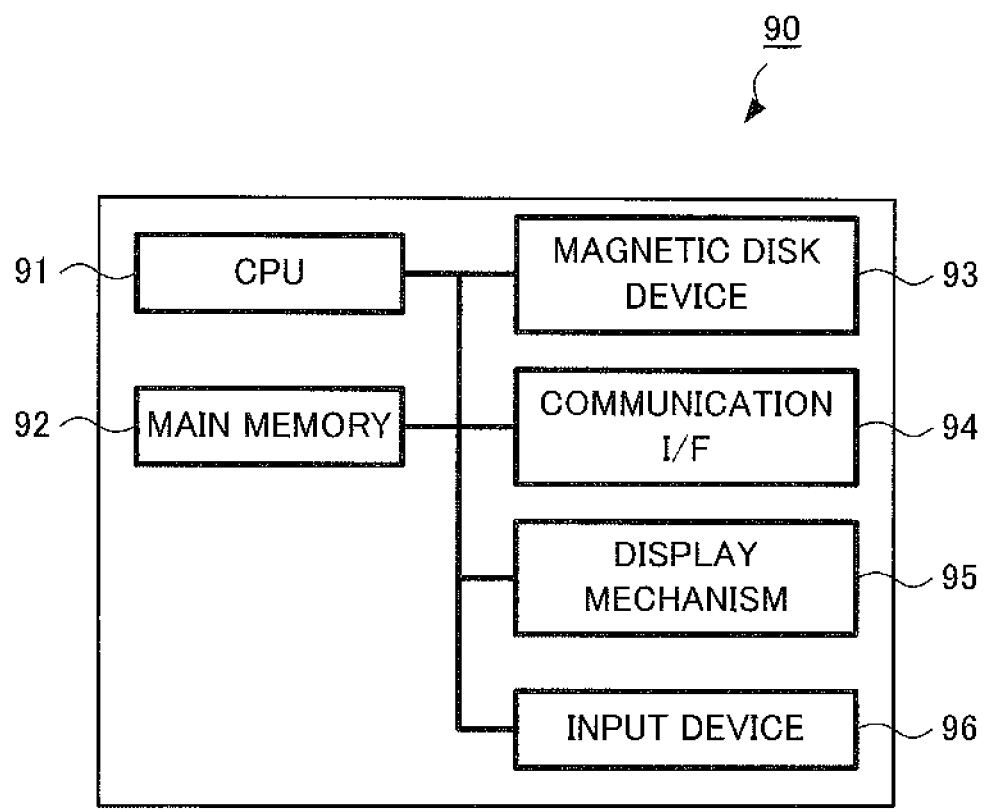
FIG. 21 is a diagram of the hardware configuration of a computer to which the exemplary embodiment is applicable.

FIG. 21 is a diagram illustrating the hardware configuration of the computer 90.

As illustrated therein, the computer 90 includes a central processing unit (CPU) 91 that serves as an arithmetic unit, and a main memory 92 and a magnetic disk device (HDD: hard disk drive) 93 that serve as storage units. Here, the CPU 91 executes an operating system (OS) and various kinds of software such as applications, and implements the various functions described above. The main memory 92 is a memory area that stores various kinds of software, data used for executing the software, and the like. The magnetic disk device 93 is a memory area that stores input data to various kinds of software, output data from various kinds of software, and the like.

Furthermore, the computer 90 includes a communication I/F 94 for communicating with an external device, a display mechanism 95 including a video memory, a display and the like, and an input device 96 such as a keyboard and a mouse.

The program that implements the present exemplary embodiment may be provided not only by a communication device but also by being stored in a memory medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    an image acquisition unit that acquires an image read from a medium having the image printed thereon, the image representing a specific bit sequence;
    an information acquisition unit that acquires a state information piece indicating a reading reliability state of the image acquired by the image acquisition unit, the state information piece being assigned to each bit;
    a detection unit that detects a bit sequence from the image acquired by the image acquisition unit; and
    a determination unit that determines the specific bit sequence on the basis of the bit sequence detected by the detection unit and the state information piece acquired by the information acquisition unit.

2. The image processing apparatus according to claim 1, wherein
    the bit sequence detected by the detection unit includes a plurality of partial bit sequences respectively corresponding to a plurality of partial images forming the image acquired by the image acquisition unit, and
    the state information piece acquired by the information acquisition unit includes a plurality of partial state information pieces respectively indicating reading reliability states of the plurality of partial images.

3. The image processing apparatus according to claim 2, wherein
    the plurality of partial images respectively represent bit sequences in a plurality of blocks after the specific bit sequence is encoded with Reed-Solomon (RS) coding, and
    the determination unit determines the specific bit sequence by performing correction with an RS code on the assumption that, when a specific partial state information piece indicating a reading reliability state of a specific partial image among the plurality of partial images indicates a predetermined unreliable state, a specific partial bit sequence detected from the specific partial image by the detection unit has an error.

4. The image processing apparatus according to claim 3, wherein the determination unit determines the specific bit sequence on the basis of a first bit sequence and a second bit sequence, the first bit sequence being acquired by performing correction with an RS code without assuming that the plurality of partial bit sequences have errors, the second bit sequence being acquired by performing correction with an RS code on the assumption that, when the specific partial state information piece indicates the unreliable state, the specific partial bit sequence has an error.

5. The image processing apparatus according to claim 4, wherein the determination unit determines whether or not the first bit sequence is determined as the specific bit sequence, on the basis of whether or not the first bit sequence is equal to the second bit sequence.

6. The image processing apparatus according to claim 5, wherein the determination unit determines the first bit sequence as the specific bit sequence when the first bit sequence is equal to the second bit sequence.

7. The image processing apparatus according to claim 6, wherein the determination unit does not determine the first bit sequence as the specific bit sequence when the first bit sequence is not equal to the second bit sequence.

8. The image processing apparatus according to claim 5, wherein the determination unit does not determine the first bit sequence as the specific bit sequence when the first bit sequence is not equal to the second bit sequence.

9. An identification apparatus comprising:

a reading unit that reads an image from a medium having the image printed thereon, the image representing a specific bit sequence indicating identification information on any one of the medium and an electronic document printed on the medium;

an information acquisition unit that acquires a state information piece indicating a reading reliability state of the image read by the reading unit, the state information piece being assigned to each bit;

a detection unit that detects a bit sequence from the image read by the reading unit;

a determination unit that determines the specific bit sequence on the basis of the bit sequence detected by the detection unit and the state information piece acquired by the information acquisition unit; and an output unit that outputs the identification information indicated by the specific bit sequence determined by the determination unit.

10. A method for determining a bit sequence comprising:

acquiring an image read from a medium having the image printed thereon, the image representing a specific bit sequence;

acquiring a state information piece indicating a reading reliability state of the image thus acquired, the state information piece being assigned to each bit;

detecting a bit sequence from the image thus acquired; and determining the specific bit sequence on the basis of the bit sequence thus detected and the state information piece thus acquired.

11. A non-transitory computer readable medium storing a program that causes a computer to execute a process for determining a bit sequence, the process comprising:

acquiring an image read from a medium having the image printed thereon, the image representing a specific bit sequence;

acquiring a state information piece indicating a reading reliability state of the image thus acquired, the state information piece being assigned to each bit;

detecting a bit sequence from the image thus acquired; and determining the specific bit sequence on the basis of the bit sequence thus detected and the state information piece thus acquired.

* * * * *